(12) United States Patent
Lefebvre et al.

(10) Patent No.: US 7,314,662 B2
(45) Date of Patent: Jan. 1, 2008

(54) ELASTOMERIC FILM WITH ANTI-SKID ADDITIVE

(75) Inventors: Julien Lefebvre, Le Gardeur (CA);
José Garrocho, Blainville (CA); Mark Frohlich, Dollard-Des-Ormeaux (CA);
Ludovic Leplatois, Montreal (CA)

(73) Assignee: Marko I.R.D.C., Inc., Saint Leonard, Quebec (CA)

( * ) Notice: Subject to any disclaimer, the term of this patent is extended or adjusted under 35 U.S.C. 154(b) by 0 days.

(21) Appl. No.: 10/670,733

(22) Filed: Sep. 26, 2003

(65) Prior Publication Data

US 2004/0115400 A1 Jun. 17, 2004

(51) Int. Cl.
*B32B 5/16* (2006.01)

(52) U.S. Cl. .................. 428/143; 428/332; 428/220; 383/120

(58) Field of Classification Search .......... 428/143, 428/220, 332–333, 500, 515–516, 520; 383/120
See application file for complete search history.

(56) References Cited

U.S. PATENT DOCUMENTS

| | | | | |
|---|---|---|---|---|
| 3,283,992 A | * | 11/1966 | Hanson et al. ............... 383/32 |
| 3,950,185 A | * | 4/1976 | Toyama et al. ............... 134/38 |
| 3,981,820 A | * | 9/1976 | Miller et al. ............ 252/301.16 |
| 4,399,173 A | * | 8/1983 | Anthony et al. ............ 428/35.2 |
| 4,424,051 A |   | 1/1984 | Lee et al. ...................... 493/37 |
| 4,954,124 A | * | 9/1990 | Erickson et al. ............. 493/195 |
| 5,194,113 A | * | 3/1993 | Lasch et al. ................. 156/243 |
| 5,236,483 A | * | 8/1993 | Miyashita et al. ............ 65/17.2 |
| 5,401,560 A | * | 3/1995 | Williams ..................... 428/143 |
| 5,419,934 A | * | 5/1995 | Wilson ........................ 428/34.9 |
| 5,451,450 A | * | 9/1995 | Erderly et al. ............... 428/220 |
| 5,732,745 A | * | 3/1998 | Lefebvre et al. ............. 138/118 |
| 5,843,540 A | * | 12/1998 | Heydarpour et al. ........ 428/35.2 |
| 5,852,135 A | * | 12/1998 | Kanai et al. ................. 525/398 |
| 5,879,768 A | * | 3/1999 | Falla et al. ................. 428/35.7 |
| 6,132,844 A | * | 10/2000 | Altshuler et al. ............ 428/143 |
| 6,413,346 B1 |   | 7/2002 | Planeta et al. ................. 156/24 |
| 6,444,080 B1 | * | 9/2002 | Mandzsu et al. ............. 156/276 |
| 6,579,607 B1 | * | 6/2003 | Gozukara et al. ............ 428/323 |
| 6,706,385 B1 | * | 3/2004 | Karaiwa ....................... 428/323 |
| 2003/0070579 A1 | * | 4/2003 | Hong et al. ............... 106/31.04 |

FOREIGN PATENT DOCUMENTS

| | | |
|---|---|---|
| CA | 2072687 | 6/1992 |
| CA | 2122968 | 9/1994 |
| WO | WO 02/017768 | 8/2001 |

* cited by examiner

*Primary Examiner*—Rena Dye
*Assistant Examiner*—Sow-Fun Hon
(74) *Attorney, Agent, or Firm*—Morgan, Lewis & Bockius LLP

(57) ABSTRACT

The present invention provides an elastomeric film having anti-skid properties. The film comprises one or more layers, wherein at least one of the layers comprises from 0.1 to 10% (by weight) of an anti-skid additive, which does not melt, or has a melt temperature greater than 500° F., and has a particle size between 50 and 500 microns. Suitable anti-skid additives may be sand, clay, silica, crosslinked polyethylenes, other polymers or ultra high molecular weight polyethylene (UHMWPE). Also provided is a resin composition and a method for manufacturing an elastomeric film having anti-skid properties.

32 Claims, 20 Drawing Sheets

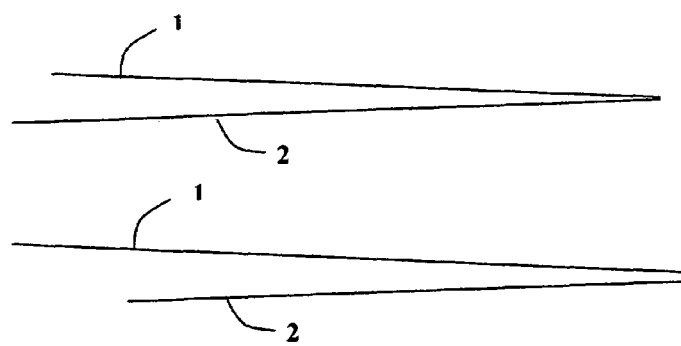
Figure 1A
Figure 1B
Figure 1C
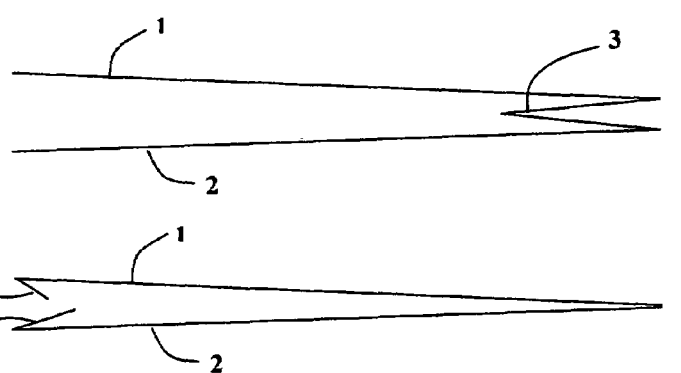
Figure 1D
Figure 1E

ELASTOMERIC FILM WITH ANTI-SKID ADDITIVE

FIELD OF THE INVENTION

This present invention pertains to the field of elastomeric films and more particularly, to the field of elastomeric films comprising an anti-skid additive.

BACKGROUND OF THE INVENTION

Wrapping materials intended to cover goods on trucks, or the like, or to cover agricultural products in the field, are well known. For many years, such wrapping materials particularly included tarpaulins. More recently, such tarpaulins have frequently been replaced with other materials, for example, polyester filament reinforced fabrics that have been coated with polyvinyl chloride (PVC) and stretch plastic films. Stretch plastic film, commonly referred to as stretch wrap, has gained substantial acceptance for such uses as warehouse packaging applications where plastic film is stretched around pallets, containers or irregular loads, with a built-in elastic recovery properties of the film constraining the surrounding item(s). A number of plastic materials, such as polyvinyl chloride (PVC), linear low density polyethylene (LLDPE), low density polyethylene (LDPE), and ethylene vinyl acetate/low density polyethylene (EVA/LDPE), are used to produce stretch film for commercial use.

A commonly used type of plastic storage film for use in the temporary storage of goods is manufactured from thermoplastic resin compositions by blown-film extrusion processes. The resins used for this purpose are, for example, low pressure linear low density polyethylene and high pressure low density polyethylene. U.S. Pat. No. 4,424,051 discloses a method and apparatus for manufacturing a two-ply agricultural bag for in-field storage of agricultural products. U.S. Pat. No. 6,413,346 discloses a stretch plastic film that is formed using a blown-film extrusion of suitable plastic material, in which the tubular film is collapsed to cause opposite sides of the collapsed film to become bonded together to form a blocked two layer film, and stretching the blocked two layer film to reduce its thickness.

These types of films and materials have the drawback of having a slippery exterior surface, for instance when wet. This can cause safety problems for workers when loading wrapped goods for transport or storage, or when walking on the wrapped goods. Furthermore, slippage of the wrapped bundles during transport or storage can result in damage to the goods. Anti-skid additives have been used in non-stretchable plastics, for example, as used in fertilizer bags to reduce movement of the bags during transport. The size and physical characteristics of the anti-skid additives used in non-stretchable plastics is not critical.

There remains a need for an elastomeric film having anti-skid properties that can be used as a wrapping material.

SUMMARY OF THE INVENTION

It is therefore an object of this invention to provide an elastomeric film comprising an anti-skid additive. In accordance with one aspect of the present invention there is provided an elastomeric film comprising one or more layers, wherein at least one of the layers comprises from 0.1 to 10% of an anti-skid additive, which anti-skid additive has a particle size between 50 and 500 microns and does not melt or has a melt temperature greater than 500° F.

In accordance with an additional aspect of the present invention there is provided a resin composition for producing an elastomeric film which combines stretch ability and anti-skid properties. Thus, according to a related aspect of the present invention there is provided a resin composition for the manufacture of one or more layers of an elastomeric film, wherein at least one of the layers comprises from 0.1 to 10% of an anti-skid additive, which anti-skid additive has a particle size ranging 50 and 500 microns and does not melt or has a melt temperature greater than 500° F.

In accordance with another aspect of the present invention there is provided a method of manufacturing an elastomeric film having anti-skid properties, comprising the steps of: (a) providing a resin composition comprising from 0.1 to 10% of an anti-skid additive, which anti-skid additive has a particle size between 50 and 500 microns and does not melt or has a melt temperature greater than 500° F.; and (b) extruding the resin composition to form the film.

BRIEF DESCRIPTION OF THE FIGURES

Further features and advantages of the present invention will become apparent from the following detailed description, taken in combination with the appended drawings, in which:

FIGS. 1A-1E are cross-sectional views of pre-folded films according to specific embodiments of the present invention.

DETAILED DESCRIPTION OF THE INVENTION

Figure 2:
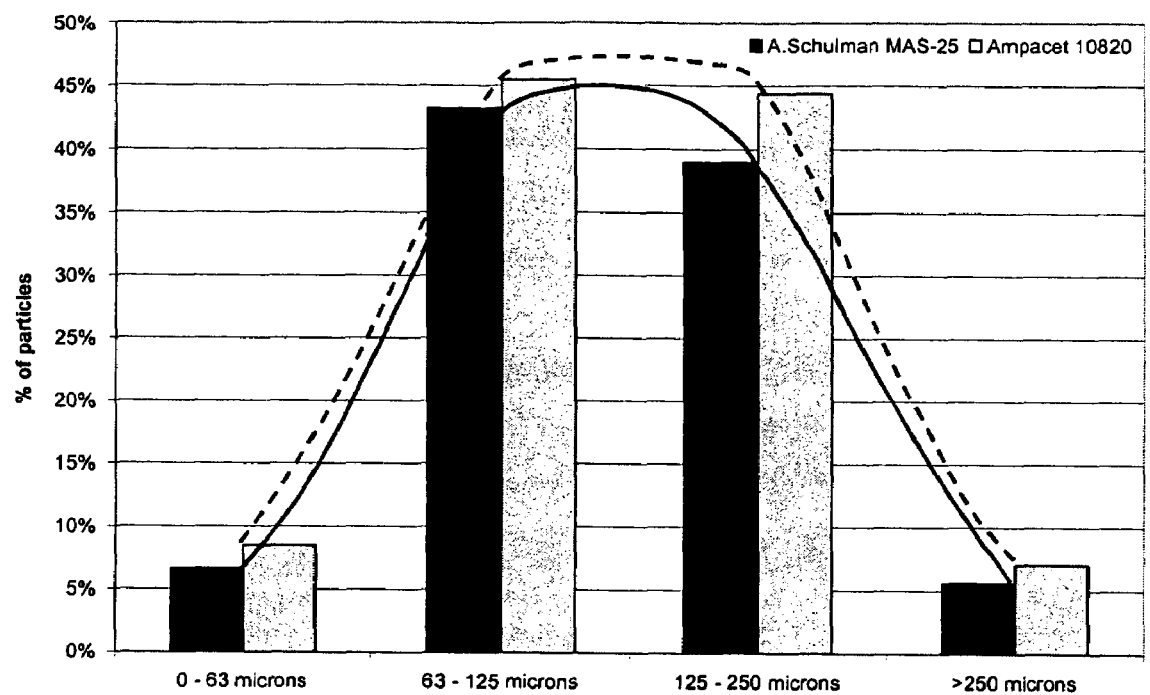
FIG. 2 is a graphical comparison of the particle size distribution of two anti-skid additives used in stretchable films of the present invention.

The elastomeric film of the present invention comprises an anti-skid additive that serves to improve the anti-skid properties (i.e. increase the frictional coefficient of the exterior surface) of the film in comparison to an equivalent film that does not contain the anti-skid additive. By way of example, the improved anti-skid properties, resulting from the incorporation of the anti-skid additive, can reduce slippage between bundles that are wrapped or covered with the film and are in contact with one another, such as during loading and/or transport, and can improve the safety of the individuals working with the film by reducing slippage that occurs when walking on the films or when loading and/or transporting wrapped bundles.

The elastomeric film of the present invention comprises one or more layers and has a thickness in the range of about 1 to about 15 mil (1 mil=1 thousandths of an inch). At least one of the layer of the film comprises an anti-skid additive, which has a particle size ranging between 50 and 500 microns and does not melt or has a melt temperature greater than 500° F.

In a specific embodiment of the present invention the film comprises three layers. The three layers are referred to herein as Layer A, the inside layer; Layer B, the middle layer; and Layer C, the outside layer. In one example of such a three-ply film, the film is manufactured with the anti-skid additive in Layer C, however, a worker skilled in the art would readily appreciate that it could be incorporated into one or more of the other layers either in addition to, or in place of, Layer C. Each layer makes up from 5 to 95% of the total thickness of the film.

Components of the Film

Resins

The compositions from which the layers of the film of the present invention are manufactured comprise one or more resin components selected from: an ethylene-vinyl acetate (EVA) copolymer; a polyolefin plastomer (POP); a linear low density polyethylene (LLDPE); and a low density polyethylene (LDPE). Further, the compositions optionally comprise additives, such as a UV stabilizer (inhibitor), a pigment, a slip agent, and/or a blocking agent.

1. Ethylene-Vinyl Acetate Copolymer

When one or more layers of the film of the present invention is prepared using EVA, the formulation or composition used to manufacture the one or more of the layers can comprise from 10 to 100%, or 10 to 95%, of pure EVA copolymer or a mixture of EVA copolymer with one or more of the other three resin components. The EVA copolymer consists of pure ethylene-vinyl acetate copolymer having 2 to 45% vinyl acetate by weight, or advantageously 2 to 35% vinyl acetate by weight. Acceptable melt indices of the EVA range between 0.1-30 g/10 min.

In one embodiment of the present invention one or more of the formulations or compositions used to manufacture the one or more layers of the film comprises 25 to 85% of EVA copolymer as described herein.

Many commercially available EVA copolymers may be used to form one or more layers of the film of the present invention. Non-limiting examples of such EVA copolymers include, but are not limited to, NA-985, NA-480, NA-441, NA 362, NA-340, NA-316, NA-314 and NA-304 (products of Equistar Chemical Corporation). In one embodiment of the present invention, the composition used to prepare the film comprises Westlake 561. Examples of other suitable EVA copolymers are 1005 VN2, 1005 VG2, 1020 VB2, 1020 VG2 and 1005 VN3 (products of ELF-ATO CHEM), Ateva 1221, 1825A, 1018, 1066, 633C, 640A, 1025, 1041C, 1047, 1060 (products of A.T. PLASTICS), PE1651, PE1753, PE1802, PE1806, PE1903, X0911 (products of Huntsman), EHA-152 and EHA-019 (products of ExxonMobil).

2. Metallocene Catalyzed or Advanced Ziegler-Natta Catalyzed Ethylene Alpha-Olefin Copolymer (Polyolefin Plastomer—POP)

In one embodiment of the present invention metallocene catalyzed or advanced Ziegler-Natta catalyzed ethylene alpha-olefin copolymer is used in place of the EVA in a composition, on a 1 for 1 basis. The copolymer can be formed using a $C_4$ to $C_{20}$ alpha-olefin or a mixture of such alpha-olefins. Examples of suitable metallocene catalyzed and/or advanced Ziegler-Natta catalyzed ethylene alpha-olefin copolymers, or POPs, include, but are not limited to Affinity PL1840, PL1880, PF1140 (products from Dow Chemical Canada, Inc.), Exact 3022, 3024, 3131, 4003, 4044, 4053, 5008 (products from ExxonMobil), MXSTEN CM27501-F, CM27502-F, CV77520-X, CV77530-X (products from Eastman Chemical Canada, Inc.).

The POP used in the compositions or formulations for manufacture of a film according to the present invention, has a density of equal to or below 0.910 g/cm$^3$ and an acceptable melt index in the range of 0.1 to 30 g/10 min. The POP may be a polymer prepared using metallocene catalysis or advanced Ziegler-Natta catalysis or it may be a mixture of metallocene and advanced Ziegler-Natta catalyzed resins.

3. Linear Low Density Polyethylene (LLDPE)

The LLDPE component of the formulations or compositions used in the manufacture of one or more the layers of the film can consist of from 5 to 100%, or 5 to 90%, of a pure LLDPE copolymer of one or more $C_4$ to $C_{20}$ alpha-olefins and ethylene. The alpha-olefin can be, for example, butene, pentene, hexene or octene. LLDPE can be prepared using a Ziegler-Natta, an advanced Ziegler-Natta or a metallocene catalyst system or a combination thereof. LLDPE has a density of greater than 0.910 g/cm$^3$ and an acceptable melt index within the range of 0.1 to 30 g/10 min.

In one embodiment of the present invention one or more of the formulations or compositions used to manufacture the one or more layers of the film comprises from 15 to 75% of LLDPE as described herein.

Non-limiting examples of suitable LLDPE resins are DOWLEX-2021, DOWLEX-2045, DOWLEX-2070, DOWLEX-2071, DOWLEX-2073 and DOWLEX-2101, (products of Dow Chemical Canada Inc.). In one embodiment of the present invention the resin composition used to prepare the plastic film comprises DOWLEX-2021. Further examples of suitable LLDPE resins are L-2007-F, L-2001-F and L-2002-F, HIFOR SC75836-X, HIFOR74837-X, (products of Eastman Chemical Company Canada, Inc.), Exceed 1018, NTX112, LTA055 (from ExxonMobil), Elite 5111, Elite 5400 (from Dow Chemical Canada, Inc.), FP120, FP026 (products from Nova Chemical Canada).

4. Low Density Polyethylene (LDPE)

The LDPE component of the formulations or compositions used in the manufacture of the one or more layers of the film can consist of from 5 to 100%, or 5 to 90%, of a pure LDPE, for example, a LDPE manufactured from an autoclave or a tubular loop reactor. The LDPE has a density of from 0.910 to 0.930 g/cm$^3$ with acceptable melt indices ranging between 0.1 to 30 g/10 min.

In one embodiment of the present invention one or more of the formulations or compositions used to manufacture the one or more layers of the film comprises from 15 to 75% of LDPE as described herein.

Non-limiting examples of suitable LDPE resins are DOW 494, DOW 133, DOW 611 (products of Dow Chemical Canada Inc.). In one embodiment of the present invention the resin composition used to prepare one or more layers of the film comprises Voridian LDPE E6838-969F (products of Eastman Chemical Company Canada, Inc.). Further examples of suitable LDPE resins are LD051 (from ExxonMobil), LF-0718 (from Nova Chemical Canada).

Selection of the appropriate resin or combination of resins is dependent on the application of the film. As demonstrated in Example II, the stretch ability and elasticity of the film can be varied depending on the composition of the layers of the film. These properties can be varied independently. For example, a resin composition can be selected to manufacture a film having high stretch ability but little or no retention force (elasticity, or elastic memory). Alternatively, a resin composition can be selected to manufacture a film having low stretch ability and high elastic memory. By way of example, increasing the vinyl acetate (VA) content of the film will result in a decrease in retention force and an increase in stretch ability. The decrease in elastic memory can be offset by increasing the amount of LLDPE or LDPE in the film composition. The present invention contemplates a variety of film compositions that are formulated for specific applications according to the teaching provided herein.

Various combinations of layers can be used in the formation of multilayer films according to the invention. The 3-layer embodiments described herein are provided as illustrations and are not intended to limit the scope of the invention. The multilayer films of the invention can also comprise more layers. Thus, modifications and variations may be utilised without departing from the principles and scope of the invention, as those skilled in the art will readily understand.

Anti-Skid Additive

An anti-skid additive is added to the film of the present invention in order to increase the frictional coefficient of a surface of the film. The size and other physical characteristics of the anti-skid additive are selected to allow the film to remain stretchable without being susceptible to the formation of micro-perforations or lensing.

A suitable anti-skid additive has a particle size within the range of 50 to 500 microns. The material from which the anti-skid additive is prepared is not critical, provided that the additive (i) has a particle size within the defined range of 50 to 500 microns; (ii) either does not melt or melts at a temperature of 500° F. or greater; and (iii) is capable of appropriate dispersion within the film. An anti-skid additive that exhibits appropriate dispersion within the film is one that exhibits good mixing properties and does not spontaneously agglomerate under film processing conditions.

Examples of suitable anti-skid additives include, but are not limited to, sand, clay, silica, cross-linked polyethylene, ultra high molecular weight polyethylene (UHMWPE) or other polymers. Within this class of anti-skid additives a sub-class of suitable anti-skid additive has a relatively narrow particle size distribution, which is advantageously between 60 and 250 microns, or more specifically, between 60 and 180 microns, and a high molecular weight (usually with a melt index below 0.1 g/10 min). In use, the anti-skid additive is usually provided in a high content masterbatch, comprising 25-85% anti-skid additive by weight. Advantageously, the anti-skid masterbatch comprises greater than 50% anti-skid additive by weight; typically between 50-70%.

When an anti-skid masterbatch is employed, the composition used to manufacture one or more layers of the film contains between 1 and 15% of anti-skid masterbatch such that the final concentration of anti-skid additive is 0.1 to 10% by weight in the one or more layers.

In an alternative embodiment the anti-skid additive is used in pure form rather than in a masterbatch. In this case, the anti-skid additive is provided at a final concentration of 0.1 to 10% by weight in one or more layers of the film.

It has been observed that the use of anti-skid additive having a particle size above 500 microns, results in the formation of micro-perforations in the film, even without stretching of the film. The use of anti-skid additive having a particle size below 50 microns results in the formation of a film that does not exhibit the desired anti-skid properties; specifically, the resulting film has a frictional coefficient that does not differ sufficiently from that of an equivalent film which does not contain the anti-skid additive.

In one embodiment of the present invention the anti-skid additive consists of an ultra high molecular weight polyethylene (UHMWPE) powder having a melt point of at least 500° F. and a particle size ranging from 50 to 500 microns. The UHMWPE is optionally produced using a cross-linking process. Specific examples of suitable, commercially available anti-skid additives of this type include Ampacet™ 10820, Spartech™ AS18411 and A. Schulman™ MAS-25.

In another embodiment of the present invention there is provided a single layered film in which the particle size of the anti-skid additive is between 60 and 180 microns.

UV Stabilizer

When used to cover material stored or transported outside, the plastic film becomes heavily exposed to UV radiation, which causes photochemical degradation and accelerated oxidation of the plastic material. As a result, the film loses its strength and elasticity and becomes prone to accidental tearing and puncturing. To protect the film from the degrading effect of UV radiation, a UV stabilizer is added to the resin composition, in an amount necessary to protect the mechanical properties of the film for at least one year. The amount of stabilizer necessary for this purpose depends on the stabilizer used. Both the choice of a suitable stabilizer and the necessary amount would be apparent to those skilled in the art. Examples of UV stabilizers which may be added to the resin composition according to the present invention are CHIMASSORB® 944, CHIMASSORB® 81, TINUVIN® 770, TINUVIN® 315, TINUVIN® 326, TINUVIN® 327, TINUVIN® 144, TINUVIN® 622, TINUVIN® 733 and TINUVIN® 765 (products of Ciba-Geigy). In a specific embodiment of the present invention CHIMASSORB® 944 is used as the UV stablizer. In a further embodiment of the present invention TINUVIN® 622 is used as the UV stabilizer.

The amount of UV stabilizer in the formulation or composition will vary depending on the layer it is being used to manufacture. In a specific embodiment of the present invention, the film comprises three layers; Layers A, B and C as previously defined herein. The formulations used in the preparation of Layer A, Layer B and Layer C comprise between 1 to 3%, 0 to 5% and 0 to 3% of UV stabilizer, respectively.

Pigment

A pigment may be added to the resin compositions of the present invention to reduce the light transmission of the film. Reducing the amount of light penetrating through the film reduces the spoilage of the product stored therein or thereunder, by eliminating or limiting photochemical processes initiated by the light. Making the film opaque also provides a protection against birds, which frequently puncture transparent tubes when attracted by their content. Pigment of any colour can be used, if compatible with the resin composition, in the amount necessary to reduce the light transmission of the film to below approximately 45%. In one embodiment of the present invention the light transmission of the film is in the range of from 25 to 35%. Reducing the light transmission beyond this range increases the cost of the product without increasing substantially the light protective capacity of the film.

The degree of opacity required is dependent on the downstream application of the film, as would be readily appreciated by a worker skilled in the art. For example, it is understood that high opacity is usually required to inhibit growth of micro-organisms. Furthermore, in the case of lumber transport and/or storage, the high opacity (defined as opacity above 85%) is required to prevent condensation from accumulating on the surface of the lumber, which would encourage mould formation and wood decay.

Examples of suitable pigments include titanium dioxide, carbon black, iron oxide, ultramarine blue, phthalocyanine green and quinacridone red. In one embodiment of the present invention the pigment is titanium dioxide.

The use of a white pigment increases the reflectivity of the film and reduces the light transmission. In a bi-layer or multi-ply film, the white pigment is preferred for the external layer, to reflect light and reduce heat build-up. A dark, light-absorbing pigment, such as carbon black, is preferred for the internal layer, to prevent light transmission.

In a specific embodiment of the present invention, the film comprises three layers; Layers A, B and C as previously defined herein. In this embodiment, Layer A comprises from 0 to 15%, or more specifically from 5 to 10%, of carbon black; Layer B comprises from 0 to 20%, or more specifically from 5 to 10%, of titanium dioxide; and Layer C comprises from 0 to 15%, or more specifically from 5 to 10%, of titanium dioxide.

Slip Agent

The film of the present invention optionally comprises a slip agent, which provides good slip and anti-blocking properties. Good slip properties include the ability of the film to slide smoothly and quickly over other surfaces, which thereby facilitates the insertion of material into tubes formed from the film and reduces the risk of accidental tearing by snags and the like extending from the material. The incorporation of a slip agent is advantageous when the film is formed in particular configurations using a blown-film process and it is, therefore, necessary to ensure that the film does not stick to the gusseting bars during the cooling process.

Good slip and anti-blocking properties are achieved by incorporating into the resin composition slip agents compatible therewith, for example fatty acid amides. Specific examples include oleamide, stearamide, erucamide and mixtures thereof.

Anti-Blocking Agent

Blocking, which is the tendency of a film to cling to itself, should also be avoided, since blocking interferes with the effective and efficient use of the film in covering and enclosing material. Anti-blocking properties can be achieved by incorporating into the resin composition suitable anti-blocking agents, for example, inorganic silica materials. In one embodiment of the present invention, the film comprises up to 20% anti-blocking agent in one or more layers. In a specific embodiment of the present invention diatomaceous earth is used as an anti-blocking agent.

In another specific embodiment of the present invention, the film comprises three layers; Layers A, B and C as previously defined herein. In this embodiment Layer A, Layer B and Layer C comprise from 1 to 5%, 0 to 5% and 0 to 5% of calcium carbonate or diatomaceous earth, respectively.

Additional Components

One or more of the layers of the film of the present invention may additionally comprise additives including, but not limited to, antistatic additives and polymer processing aids (e.g. fluoroelastomers). For example, a fluoroelastomer can be added to one or more layer in order to improve processing of the film and thereby optimise the physical properties of the film. Examples of commercially available fluoroelastomers suitable for use in the compositions and film of the present invention are the Viton® fluoroelastomers produced by Dow-Dupont Elastomers.

In a specific embodiment of the present invention, the film comprises three layers; Layers A, B and C as previously defined herein. In a related embodiment, Layer A and Layer B each contain from 0 to 5% of an antistatic additive and Layer C comprises approximately 2% of a fluoroelastomer.

Masterbatches of additives can be used in the preparation of the compositions of the present invention. A masterbatch is a mixture of a non-resinous agent and a polyethylene base, usually a linear low density polyethylene (LLDPE) and/or low density polyethylene (LDPE). The composition of a given masterbatch may vary depending on the non-resinous component and its required amount in the resin composition. For example, a pigment masterbatch may contain 50% of a pigment and 50% of the polyethylene base, whereas the UV stabilizer masterbatch may contain 10% of a UV stabilizer and 90% of the polyethylene base. The slip agent masterbatch may contain 4.5% of a slip agent, 10% of an anti-blocking agent and 85.5% of the polyethylene base. The composition of a masterbatch is not critical and the ratio of the non-resinous agent to the polyethylene base may be appropriately adjusted, depending on the required properties of the film, such as light transmission, UV stability or slip and anti-blocking properties. A person skilled in the art would be able to make necessary adjustments and even if experimentation were required this would be of a routine nature and would not involve the exercise of any inventive faculty.

Preparation of the Film

The elastomeric film of the present invention can be manufactured in the form of a tube by a continuous blown-film process, using equipment known to those skilled in the art. In the case of bilayer and multilayer films of the present invention, the films can be formed using a co-extrusion process. The process of co-extrusion allows a good adherence of the layers of the film to be achieved. In the co-extrusion process the extruder is operated at blow-up and draw-down ratios similar to those used in the case of the monolayer tube. The layers of the bilayer or multilayer films of the present invention may be extruded using the same or different resin compositions and may have the same or different thickness. The layers are normally characterised by similar levels of UV protection and slip properties.

In the preparation of the elastomeric film of the present invention using blown film extrusion techniques, it was necessary to take into consideration the effect of the anti-skid additives on the extrusion process and the integrity of the resultant film. In particular, it was found that a relationship exists between the film properties and the anti-skid particle size, the blow-up ratio and the size of the die gap. The term, "blow-up ratio," refers to the ratio of the final bubble diameter to the die diameter. "Die gap" refers to the distance between the metal faces forming the die opening. The term "draw down ratio," refers to the ratio of the die gap to the film thickness.

It is well known to workers skilled in the art that both a wider die gap and a higher blow up ratio can yield a film of higher elasticity, when keeping all other conditions consistent. In the present invention it was further found that the use of a wider die gap will permit the use of a lower blow-up ratio and/or use of higher percentages of anti-skid additive (up to 10%) and/or use of anti-skid additive having a larger particle size (up to 500 microns). Similarly, the use of a higher blow-up ratio will permit the use of a narrower dye gap and/or use of higher percentages of anti-skid additive (up to 10%) and/or use of anti-skid additive having a larger particle size (up to 500 microns).

Acceptable die gap sizes are 45-120 thousandths of one inch (mil), advantageously between 55-100; allowable draw down ratios between 6 and 40, advantageously between 10 and 30, blow-up ratios between 2 and 5, advantageously between 2.5 and 4.5. In each case the particle size and/or the amount of anti-skid additive used in the preparation of the film is adjusted to ensure that the film has the appropriate film properties; such as, elasticity, improved anti-skid effect and resistance to lensing or micro-perforation formation.

In one embodiment, after being laid flat, the tube is wound on to a windup roll for storage. Storage tubes for use with a loader device are prepared by unwinding the tube from the roll and cutting off sections of the required length, for example 150 feet long.

In a related embodiment, the roll of film can be pre-folded in accordance with the type of package wrapping for which the film will be used and, if applicable, the type of machine used to wrap the film around the package(s). For instance, the film can be pre-folded as described and depicted in International PCT Publication No. WO 01/64514. WO 01/64514 discloses two configurations that may be applied to the film of the present invention. In one configuration the film is used to form bags that may be used in five-face wrapping and in a second configuration the film is used to form tubes that may be used in four-face wrapping. In each case the configuration may be varied depending on the method by which the film is used to wrap a bundle (e.g. pallet) and the machine that is used to perform the wrapping.

In accordance with one embodiment of the present invention, the film is provided in a pre-folded film tube.

With reference to FIGS. 1A to 1E, and in accordance with another embodiment of the present invention, the film is provided in a pre-folded film sheet having opposed film panels, an open edge and a parallel closed edge positioned opposite the open edge. This pre-folded film sheet may be in the form of a U-film in which the opposed film panels 1 and 2 are of equal size or a J-film in which the opposed film panels 1 and 2 are of different sizes. A cross-sectional view of a U-film and a J-film is depicted in FIGS. 1A and 1B, respectively. Alternatively, the pre-folded film sheet is in the form of a gussetted film or tube. In the case of the gussetted film, the closed parallel edge of a U-film or J-film is folded, for example, by a gusset former, inwardly to form a gusset 3. FIG. 1C is a cross-sectional view of a U-film having a gusset formed in the closed edge of the film.

The open edge of a U-film or J-film corresponds to the edges of the opposed film panels 1 and 2, whereas the parallel closed edge corresponds to a parallel fold connecting the opposed film panels 1 and 2 along the length of the film. Optionally, the edges of the opposed film panels are folded inwardly to form a pair of inwardly folded lips 4 and 5. FIGS. 1D and 1E are cross-sectional views of a U-film and a gussetted film having inwardly folded lips 4 and 5. Optionally, the lips 4 and 5 may be adhered to the underside of a portion of each of the corresponding opposed film panels to form two reinforced portions at the open edge of the U-film, J-film or gusseted film. The lips may be offset with respect to one another such that one lip is large than the other lip or they may be equal to one another.

Film Characteristics

The film of the present invention is elastomeric and does not exhibit significant lensing or micro-perforation formation as a result of the incorporation of the anti-skid additive. Minor amounts of lensing or microperforation formation may occur provided that the integrity and elasticity of the film is not compromised. Samples of the film can be tested for elasticity by determining the stretch ability of a sample of the film in the transverse direction using standard techniques known in the art and/or the techniques described in the following Examples.

One example of a test used to determine the stretch ability of a sample of a film is described in Example II provided herein.

To gain a better understanding of the invention described herein, the following examples are set forth. It should be understood that these examples are for illustrative purposes only. Therefore, they should not limit the scope of this invention in any way.

EXAMPLES

Example I

Composition of a Three-ply Elastomeric Film Containing Anti-skid Additive

A three layer film, having a thickness of between 1 mil to 15 mil was prepared using a blown film co-extrusion process. The composition of the layers is provided below.

1. Layer A (inside layer):
    15% layer thickness consisting of:
        49% ethylene vinyl acetate copolymer, 6.5% by weight of vinyl acetate
        33% linear low density polyethylene, hexene copolymer produced using an advanced Ziegler-Natta catalyst
        7% carbon black masterbatch
        7% calcium carbonate masterbatch (70% by weight)
        2% UV inhibitor, CHIMASORB® 944 from Ciba Geigy
        2% antistatic additive masterbatch 2. Layer B (middle layer):
　　70% layer thickness consisting of:
　　　　54% ethylene vinyl acetate copolymer, 6.5% by weight of vinyl acetate.
　　　　36% polyethylene copolymer of hexene produced with an advanced Ziegler-Natta catalyst.
　　　　6% titanium dioxide (white pigment) masterbatch.
　　　　2% UV inhibitor, CHIMASORB® 944 from Ciba Geigy.
　　　　2% antistatic additive masterbatch.
3. Layer C (outside layer):
　　15% layer thickness consisting of:
　　　　53% ethylene vinyl acetate copolymer, 6.5% by weight of vinyl acetate.
　　　　35% polyethylene copolymer of hexene produced with an advanced Ziegler-Natta catalyst
　　　　6% titanium dioxide (white pigment) masterbatch
　　　　2% UV inhibitor, CHIMASORB® 944 from Ciba Geigy
　　　　2% fluoroelastomer manufactured and sold by Viton®.
　　　　2% antiskid additive masterbatch, wherein the additive consisted of fine particles of UHMWPE, particle size between 50 and 500 microns (Spartech™ AS 18411).

Example II

Mechanical and Tensile Investigations

As used herein, the phrase "machine direction", herein abbreviated "MD", refers to a direction "along the length" of the film, i.e., in the direction of the film as the film is formed during extrusion. As used herein, the phrase "transverse direction", herein abbreviated "TD", refers to a direction across the film, perpendicular to the machine or longitudinal direction.

A. Film Manufacture

The manufacturing of the multi-layer blown films described herein was performed using a blown film machine having the following characteristics are:
　　Die pancake technology
　　$\Phi_{die}$=9" (die diameter)
　　$e_{die}$=84 mil (die gap)
　　$e_{film}$=4 mil (film thickness)
　　28" (BUR=2.0) or 42" (BUR=3.0) bubble diameter
　　350° F. all along the barrel up to the screen changer
　　3 extruders (A/B/C)
　　Total output ~420 lbs/h
　　No corona treatment
　　No trim off The following formulations and film structures were manufactured and studied as described herein:
　　Formulation 1 was a multi-layer A/B/C made of LDPE. It comprised three adjacent layers of LDPE E6838-969 from Voridian (MI=0.7 g/10 min, d=0.921 g/cm$^3$).

| 20% | LAYER A | 100% LDPE |
| 60% | LAYER B | 100% LDPE |
| 20% | LAYER C | 100% LDPE |

Although this formulation is used to produce a multi-layer film, since it contains three identical layers it has properties of a mono-layer film.

Formulation 2 was a multi-layer A/B/C containing both LDPE and EVA. LDPE was E6838-969 from Voridian (MI=0.7 g/10 min, d=0.921 g/cm$^3$) and EVA was ATEVA 1066BSA from AT Plastics (MI=0.3 g/10 min, d=0.930 g/cm$^3$).

| 20% | LAYER A | 100% LDPE |
| 60% | LAYER B | 100% EVA (6%) |
| 20% | LAYER C | 100% LDPE |

VA (vinyl acetate) content was determined by infrared (IR) spectroscopy to be 3.4% of the whole structure.

Formulation 3 was a multi-layer A/B/C containing both LDPE and EVA. LDPE was still E6838-969 from Voridian (MI=0.7 g/10 min, d=0.921 g/cm$^3$) and EVA was ATEVA 1211 from AT Plastics (MI=0.8 g/10 min, d=0.932 g/cm$^3$).

| 20% | LAYER A | 100% LDPE |
| 60% | LAYER B | 100% EVA (12%) |
| 20% | LAYER C | 100% LDPE |

VA (vinyl acetate) content was determined by IR spectroscopy to be 7.8% of the whole structure.

Formulation 4 was a multi-layer A/B/C containing both LDPE and EVA. LDPE was still E6838-969 from Voridian (MI=0.7 g/10 min, d=0.921 g/cm$^3$) and EVA was ATEVA 1821 from AT Plastics (MI=3.0 g/10 min, d=0.938 g/cm$^3$).

| 20% | LAYER A | 100% LDPE |
| 60% | LAYER B | 100% EVA (18%) |
| 20% | LAYER C | 100% LDPE |

VA (vinyl acetate) content was determined by IR spectroscopy to be 11.0% of the whole structure.

Formulation 5 was a multi-layer A/B/C LLDPE. It comprised three adjacent layers of LLDPE FP117A from Nova (MI=1.0 g/10 min, d=0.917 g/cm$^3$).

| 20% | LAYER A | 100% LLDPE |
| 60% | LAYER B | 100% LLDPE |
| 20% | LAYER C | 100% LLDPE |

Although this formulation is used to produce a multi-layer film, since it contains three identical layers it has properties of a mono-layer film.

Formulation 6 was a multi-layer A/B/C containing both LLDPE and plastomer. LLDPE was FP117A from Nova (MI=1.0 g/10 min, d=0.917 g/cm$^3$) and plastomer was a blend 50/50 of Affinity PF 1140 and PL 1880 from Dow (MI=1.25 g/10 min, d=0.900 g/cm$^3$).

| 20% | LAYER A | 100% LLDPE |
| 60% | LAYER B | 50% plastomer 1 + 50% plastomer 2 |
| 20% | LAYER C | 100% LLDPE |

Formulation 7 was a multi-layer A/B/C containing LDPE, LLDPE and EVA. LDPE was LD051 from Exxon Mobil (MI=0.25 g/10 min, d=0.918 g/cm$^3$), LLDPE was Elite 5400 from Dow (MI=1.0 g/10 min, d=0.916 g/cm³) and EVA was ATEVA 1066BSA from AT Plastics (MI=0.3 g/10 min, d=0.930 g/cm³).

| 20% | LAYER A | 50% LDPE + 50% EVA (6%) |
| 60% | LAYER B | 60% EVA (6%) + 40% LLDPE |
| 20% | LAYER C | 52% EVA (6%) + 35% LLDPE + 13% CaCO₃ |

In addition to this, two blow-up ratios (BUR), 2.0 and 3.0, were employed during manufacturing, BUR of 2.0 corresponded to 28" and BUR of 3.0 to 42" lay-flat tubing.

The nomenclature used to identify the films referred to in this Example includes the number of the formulation, as indicated above, used to prepare the film, followed by letter A, B, C, D, E, or F, having the meaning as summarised in the following table. In the present example the anti-skid was incorporated into layer C, however, it is understood that that the anti-skid could be incorporated into any or all of the layers of the film.

|  | A | B | C | D | E | F |
|---|---|---|---|---|---|---|
| BUR | 2.0 | 3.0 | 2.0 | 3.0 | 2.0 | 3.0 |
| Anti-skid masterbatch | 0% | 0% | 5.0% | 5.0% | 5.0% | 5.0% |
| Particle size distribution | — | — | narrow* | narrow* | broad** | broad** |

*Narrow particle size distribution refers to A. Schulman MAS-25, having L50 of around 125 µm.
**Broad particle size distribution refers to Ampacet 10820, having L50 of around 120 µm.

Thus, for example, "5C" refers to a film prepared from formulation 5, using a BUR of 2.0 and comprising 5% of anti-skid masterbatch having narrow particle size distribution.

In each case the anti-skid masterbatch contained 25% anti-skid additive (by weight). Therefore, the final amount of anti-skid additive present was 1.25% (by weight). FIG. 2 is a graphical comparison of the particle size distributions of the two anti-skid additives used in this investigation. As depicted in FIG. 2, Ampacet 10820 has a relatively broad particle size distribution in comparison to that of A. Schulman MAS-25.

B. Testing

The films were investigated using mechanical tests and procedures to estimate their capacity for stretch and retention.

Mechanical Testing

Tensile properties (ASTM D-882) on all formulations of sample B only (i.e. BUR=3.0 and no anti-skid);
Elmendorf MD/TD tear properties (ASTM D-1922) on all formulations of samples B, D and F (i.e. BUR=3.0);
Low friction puncture properties (BALCAN method) on all formulations of samples B, D and F (i.e. BUR=3.0);
Dart impact properties (ASTM D-1709 method A & B) on all formulations of sample B only (i.e. BUR=3.0 and no anti-skid) and on sample 7D and 7F for evaluating the influence of anti-skid on the impact resistance.

Tensile Properties

1. "Creep test", as described below, which is used to evaluate stretch ability of the films;

A specific procedure that was used for evaluating stretch ability of the films of the present invention is referred to as a "creep test". As used herein, the term "creep" refers to the slow, progressive deformation or elongation of a test sample over time, when maintained under a constant stress.

Figure 3:
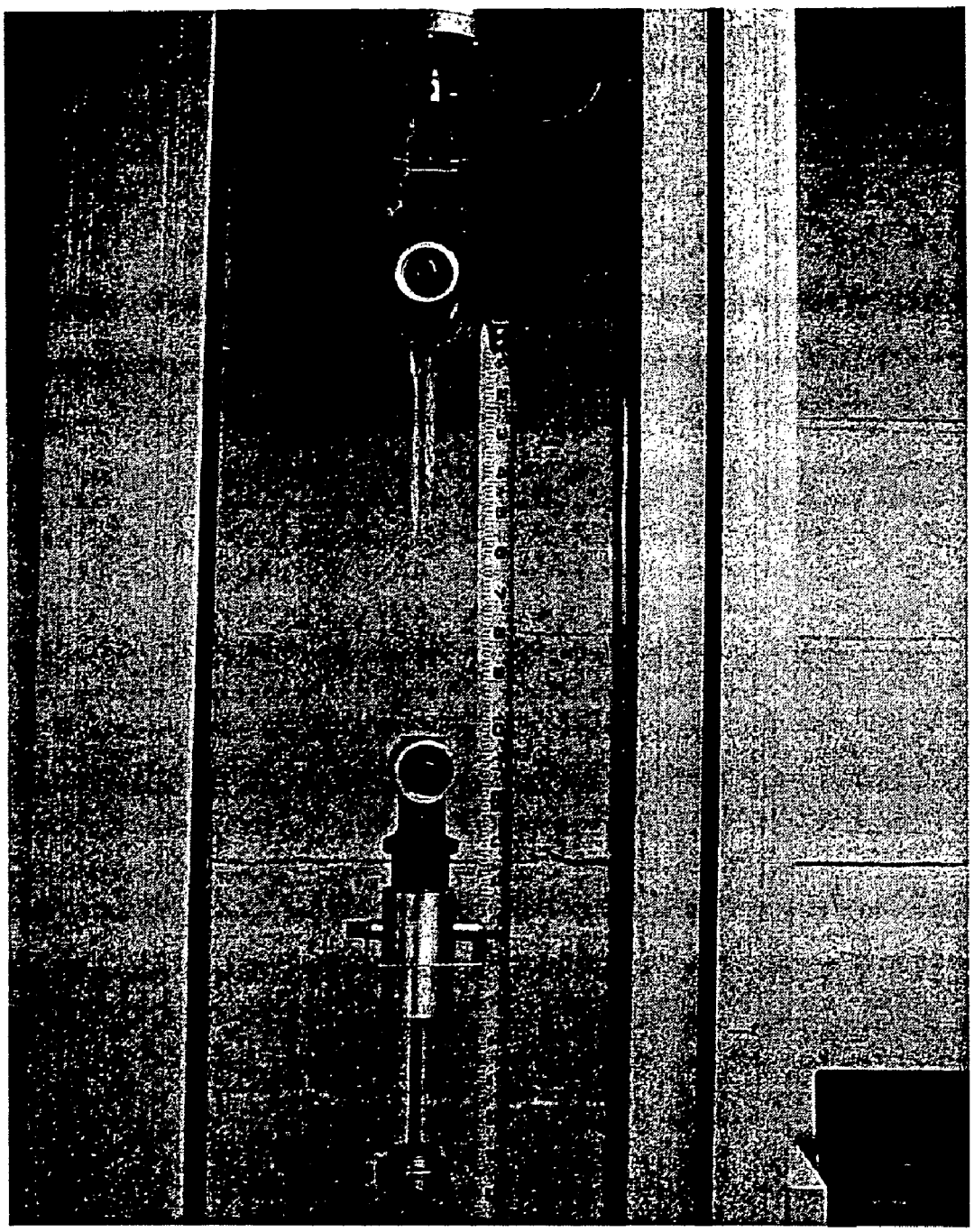
FIG. 3 is a photograph of the set-up for evaluating the stretch ability of films.

In performing this procedure, a 1-inch wide strip of film is attached at one end to a mass calculated to have an average stress of 1000 Psi, and the other end of the film is attached to a grip of a tensile machine. In the present example, the initial distance between the two ends of the film was 8 inches, however, this distance may be different as long as it is consistent between samples tested. The photograph in FIG. 3 illustrates this testing set-up, using the tensile machine INSTRON 4411.

The procedure comprises the steps of measuring the elongation of the film strip after various time intervals. The creep direction corresponds to the transversal direction of the film. Measurements were performed at various times (e.g. 10, 30, 60, 90 and 120 seconds). To confirm consistency, the test was repeated on three to five film strips and the results of the tests were used to calculate an average measurement value. A "stretch index" (SI) can be calculated, similar to a melt index, as being the elongation after 1 minute under a stress of 1000 Psi. This is an indicator that is used for the basis of comparing various films.

The mass required to obtain a stress of 1000 Psi was calculated using the weight in lbs, and the average film thickness expressed in mil. For example, a film having a thickness of 1 mil and a width of 1 inch would require 1 lb i.e. 454 g to obtain an average stress value of 1000 Psi.

2. The "stress relaxation test", as described below, is used to evaluate retention force of the films. Retention force refers to the elastic force remaining in the film after stretching.

The principle of this testing procedure is based on stress relaxation phenomenon and is used to estimate the retention force remaining in the film after a stretching cycle. During a stretching cycle the sample is stretched mechanically in its transversal direction (TD), for example, using INSTRON 4411, up to x % elongation and then brought back to y % elongation, y being lower than x. It is important to recognise that this method may be performed using any traction machine.

Figure 4:
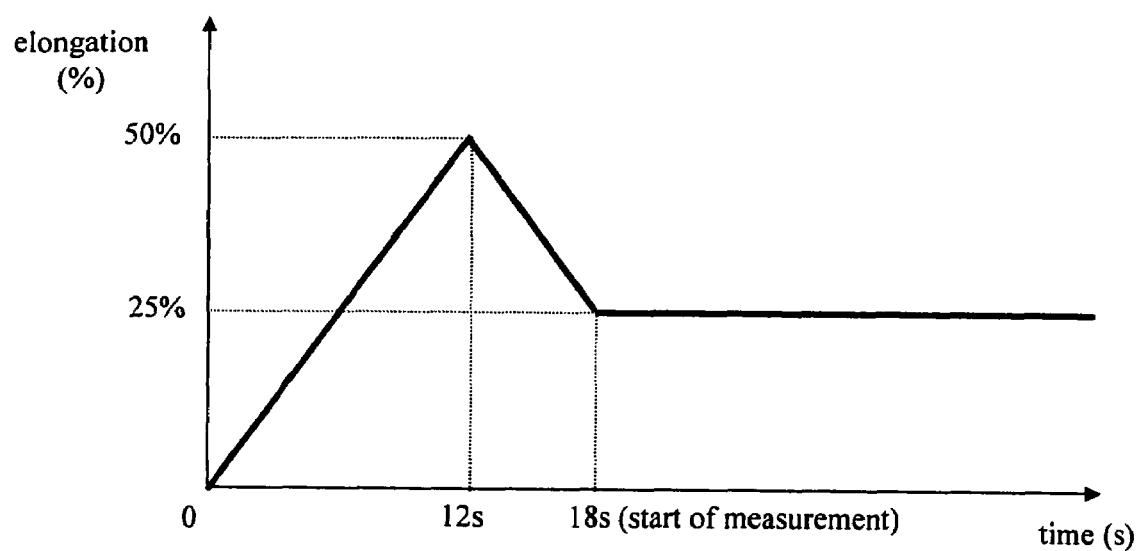
FIG. 4 illustrates a stretching cycle used during elastic force evaluation of a film.

In the present example, x % equalled 50% and y % equalled 25%. The initial sample dimensions were 8"×1". Each end of the sample strip tested was grasped using a grip of the traction machine. The moving velocity of the upper grip was set at the maximum value of the traction machine, being 20 inch/min. Thus, 12 seconds were required for stretching to 50% and 6 seconds for coming back to 25% elongation, which corresponded to a total stretching cycle of 18 seconds (illustrated in FIG. 4).

Figure 5:
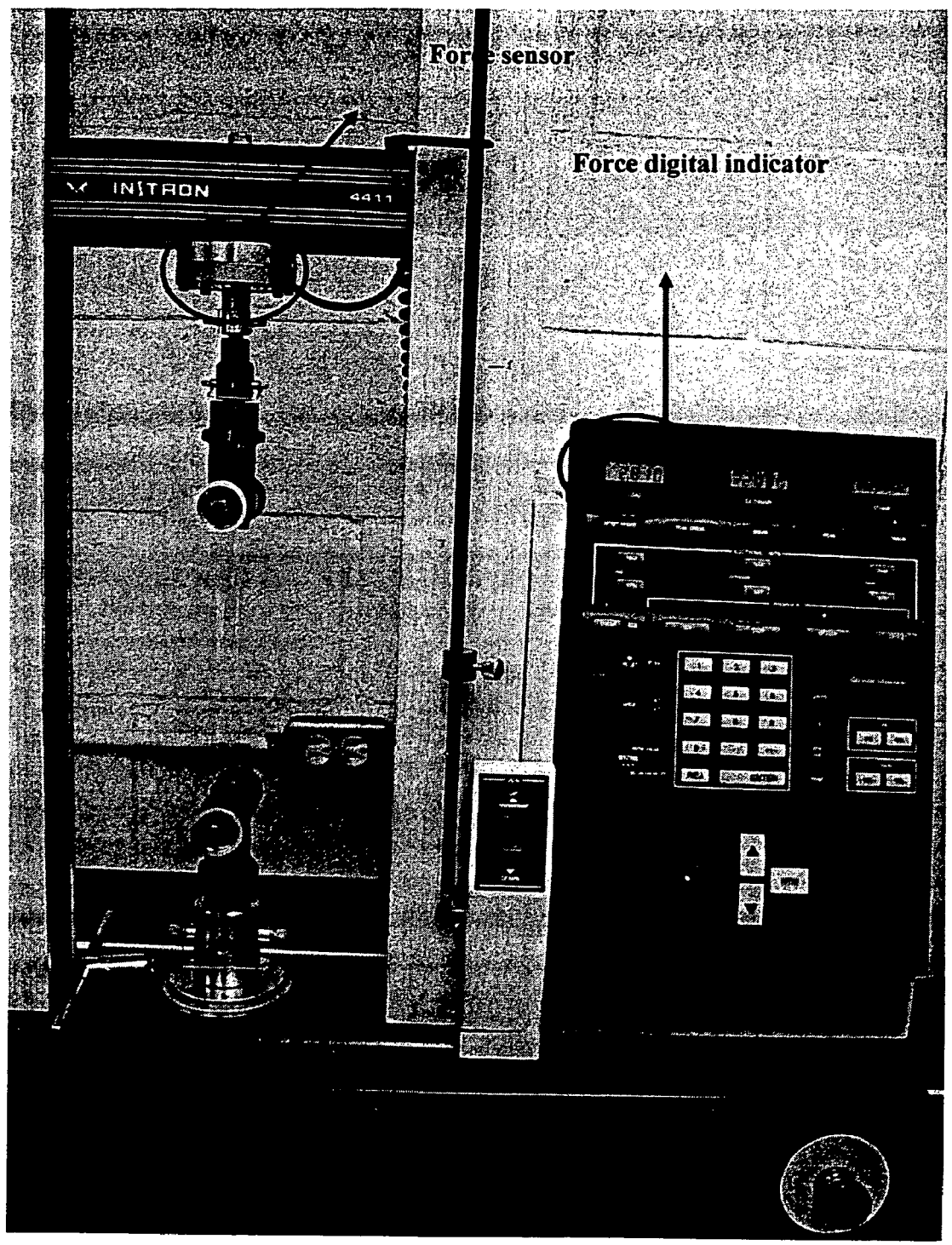
FIG. 5 is a photograph of the set-up for evaluating elastic force of films.

Measurements were taken at 0, 30 s, 1 min, 2 min, 3 min, 4 min and 5 min. For consistency, measurements were repeated on 3 to 5 test strips and the results were used to calculate an average measurement value. The photograph in FIG. 5 shows the experimental set-up in progress.

C. Results

Mechanical Testing

1. Tensile Properties

The following properties were measured in the transverse dimension (TD) of the film. Most often, tensile properties in machine direction (MD) do not exhibit any yield and MD modulus and MD elongation at break, i.e. film rupture, are generally lower due to the anisotropy of the film.

Figure 6:
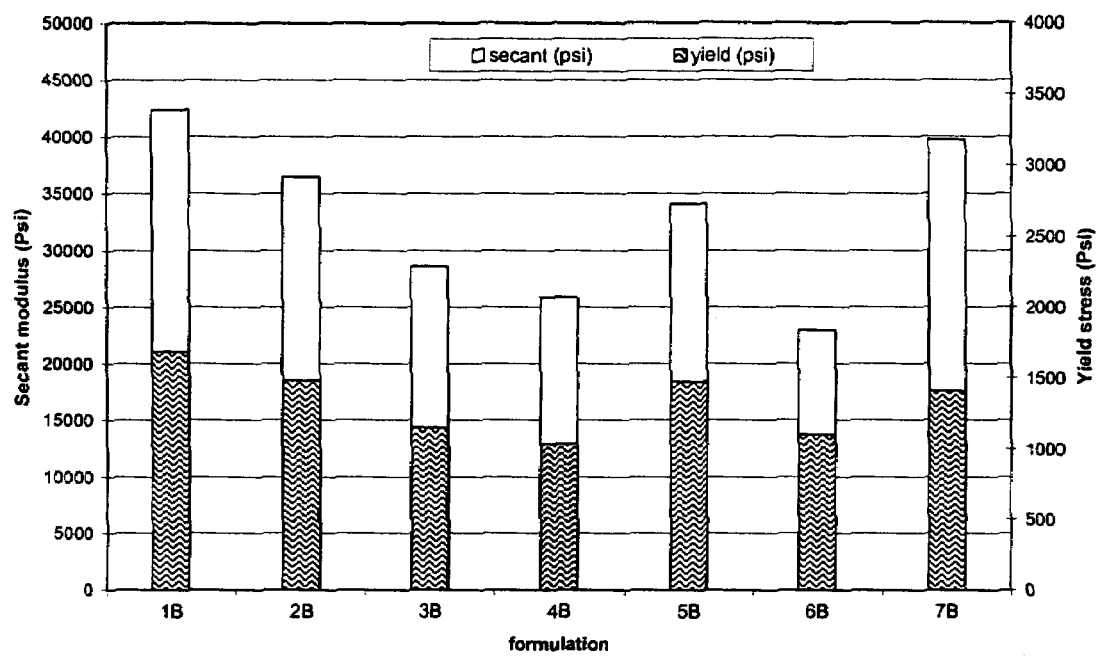
FIG. 6 illustrates the effect of various formulations on the tensile properties, secant modulus and yield stress, of films prepared using various formulations.

FIG. 6 depicts the secant modulus and yield stress observed for various films. The term "secant modulus" refers to the ratio of nominal stress to corresponding strain at any specified point on a stress-strain curve. The secant modulus plotted in FIG. 6 is calculated at 1% strain and referred to as the so-called, 1%-secant modulus. The yield stress and modulus of Film 1B, which was made of LDPE, was found to be superior to that of Film 5B, which was made of LLDPE. This is likely due to the fact that the density of Film 1B is higher than that of Film 5B (0.921 g/cm$^3$ versus 0.917 g/cm$^3$). At similar density, however, a film made of LLDPE would be expected to exhibit a higher yield stress and modulus.

Figure 7:
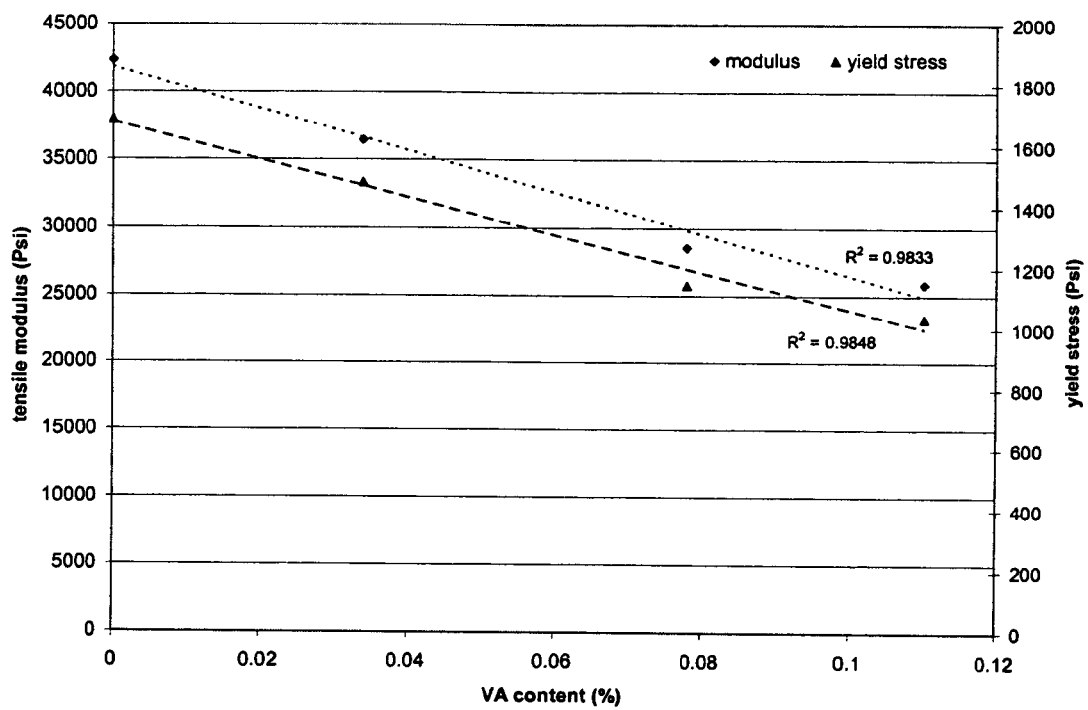
FIG. 7 illustrates the effect of vinyl acetate (VA) content on tensile modulus and yield stress.

The addition of EVA in the core layer was found to reduce yield stress and modulus. A linear correlation was found to exist between amount of EVA and yield stress and modulus (See FIG. 7).

Figure 8:
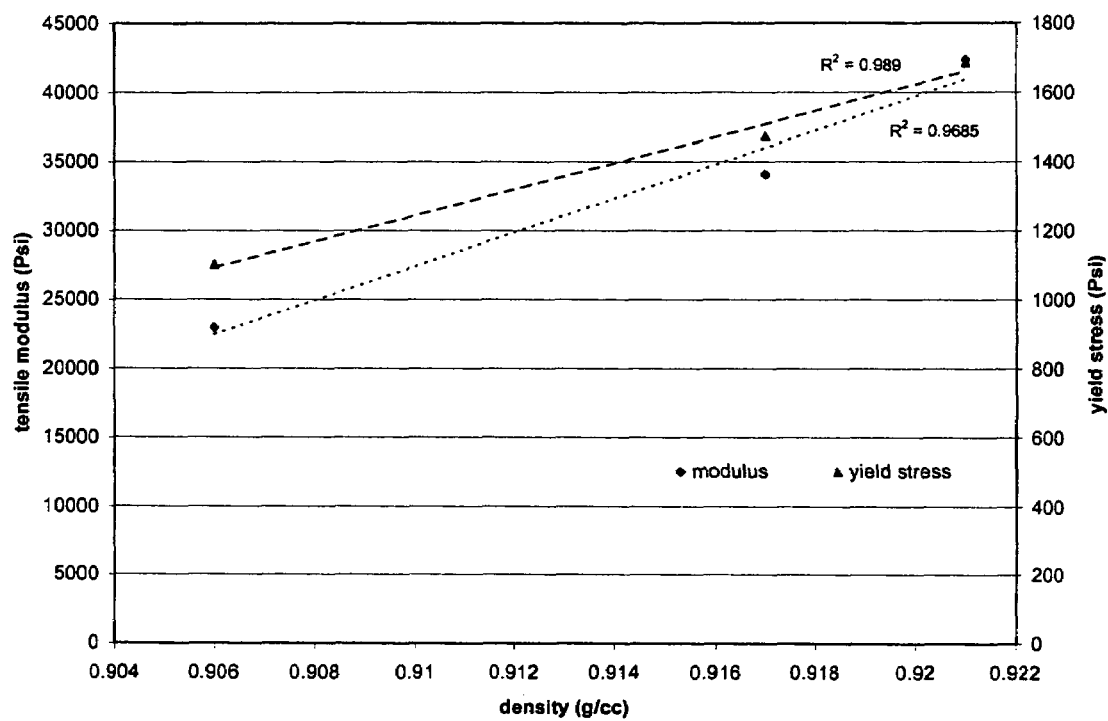
FIG. 8 illustrates the effect of density on tensile modulus and yield stress.

Use of plastomer was found to significantly affect the tensile properties of the film. In comparison to formulation 5B, formulation 6B exhibited a decrease in modulus and yield stress. For pure polyolefin film (formulation 1B, 5B and 6B), the yield stress and tensile modulus appeared to be directly proportional to the final density of the film, as depicted in FIG. 8.

Although formulation 7B contained LLDPE while formulation 2B did not, these films exhibited similar tensile strength. These two formulations have approximately the same VA content.

Figure 9:
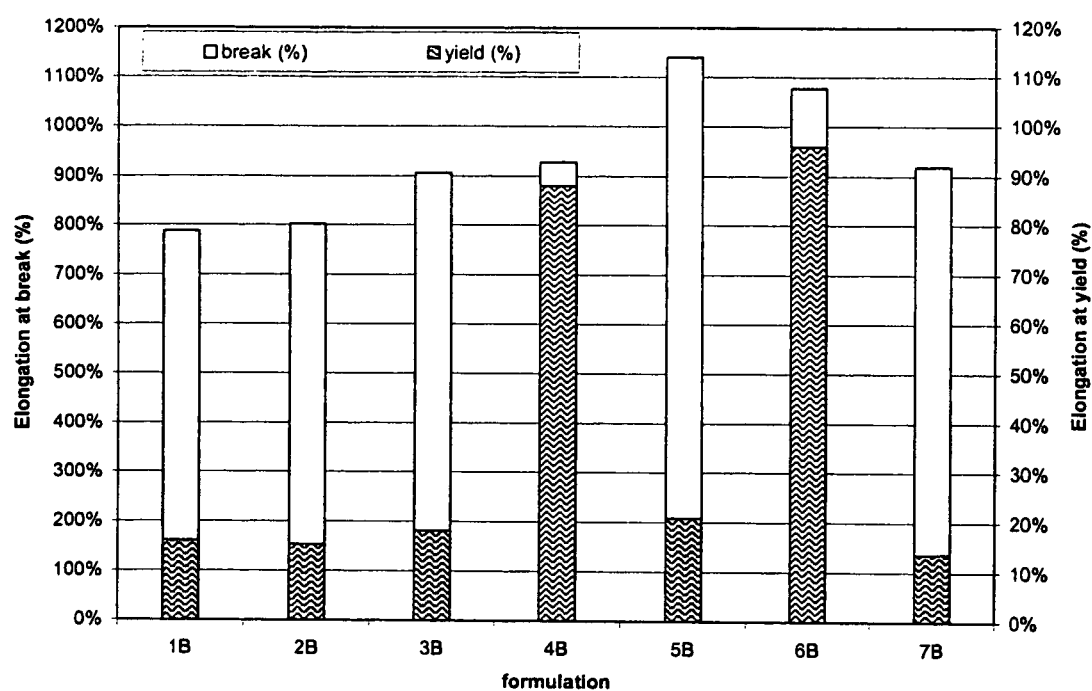
FIG. 9 illustrates the effect of various formulations on the tensile properties, elongation at break and elongation at yield.

As depicted in FIG. 9, the use of EVA or plastomer in the films improved elongation at yield and at break, with the highest elongations coming from the use of plastomer. There does not seem to be a linear correlation between the elongation at yield or at break and the VA content.

The effect of lower BUR (i.e. equal to 2.0) on tensile properties was not investigated, since the literature in this area has shown that this processing parameter had little influence. While this is true for tensile strength values, a significant effect was observed on tensile elongations at yield and at break was observed with blow-up ratio (BUR).

2. Impact Resistance

Impact resistance was evaluated using dart impact ASTM method D-1709 A & B. Dart impact values are generally expressed in g/mil. In addition, method A was used for films from low to medium impact resistance and method B for films having from medium to high impact resistance. In order to compare films tested independently by method A or B, results were expressed in terms of energy to break per mil of thickness (i.e. in J/mil).

Figure 10:
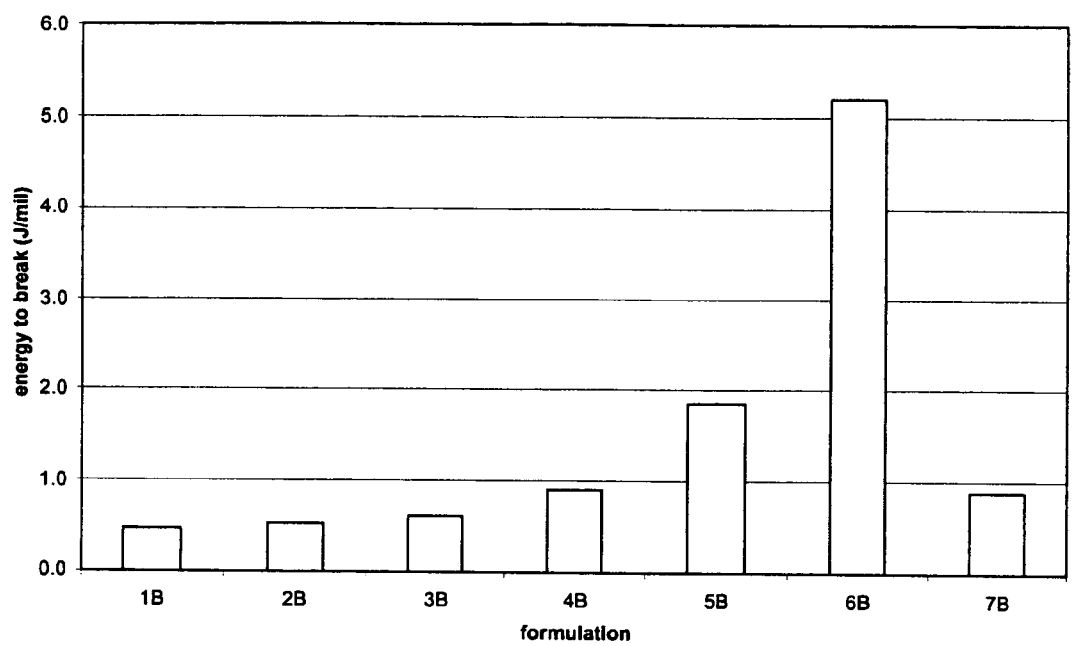
FIG. 10 illustrates the effect of various formulations on dart impact film properties.

Thus, because of its high impact resistance formulation 6B was tested using method B. All the other formulations were tested using method A. As shown in FIG. 10, the use of plastomer improves the impact resistance (3 to 5 times better) of the film. On the other hand, impact resistance is also improved when increasing the VA content (see formulation 2B, 3B and 4B). However, this gain is limited.

Figure 11:
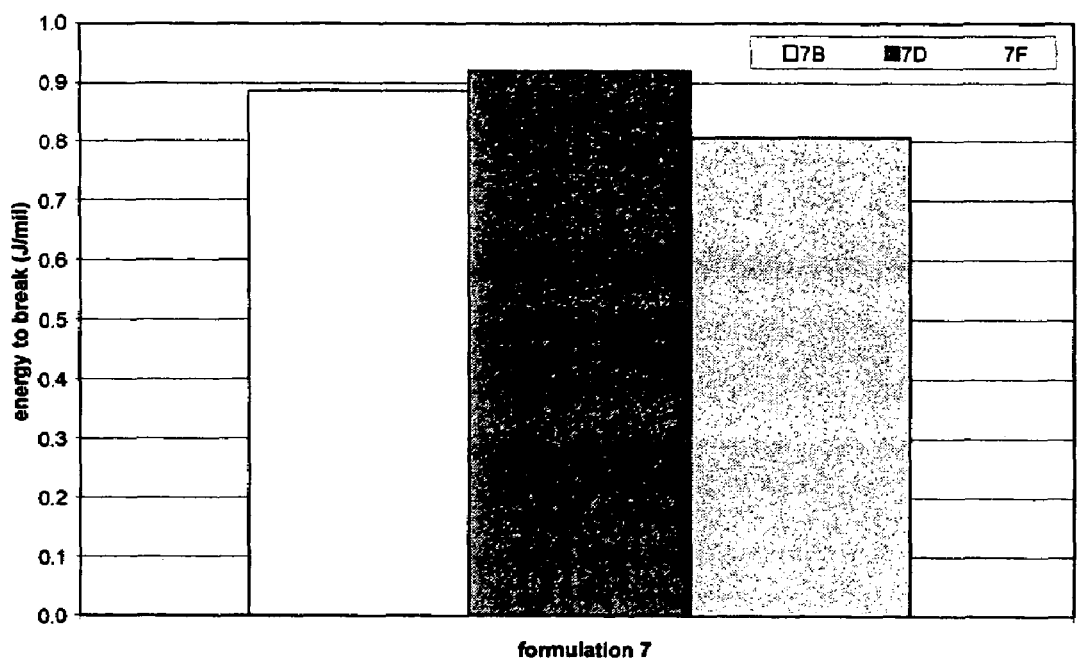
FIG. 11 illustrates the effect of anti-skid particle size distribution on dart impact film properties.
Figure 12:
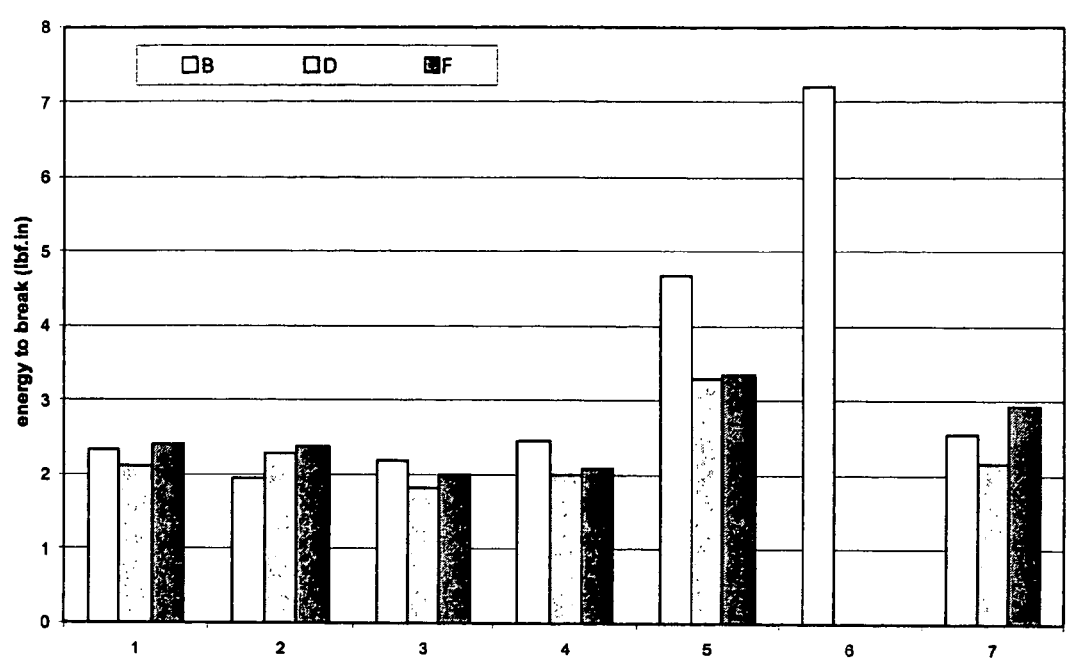
FIG. 12 illustrates the effect of various formulations and processing parameters on low friction puncture.

As shown in FIG. 11, the presence of anti-skid and the type of anti-skid did not significantly influence the impact resistance of the film. While not intending to be bound by theory, this may be due to the fact that there are two antagonist fracture phenomena that are in opposition for impact performance. The presence of the anti-skid may stiffen the film and provide, to a certain extent, higher impact force. However, the dispersion of anti-skid in the film may also act in the reverse, since each particle may be seen as a weak spot where stress may be concentrated and a crack can propagate.

3. Puncture Resistance

This testing was performed under low friction conditions to avoid the friction effect that can differ from one film to another during dart perforation. Therefore, a lubricating gel was used on the dart and the film, to allow the assumption that there was no friction phenomenon occurring (COF~0). This permits a basis for consistent comparison between different film formulations.

Figure 13:
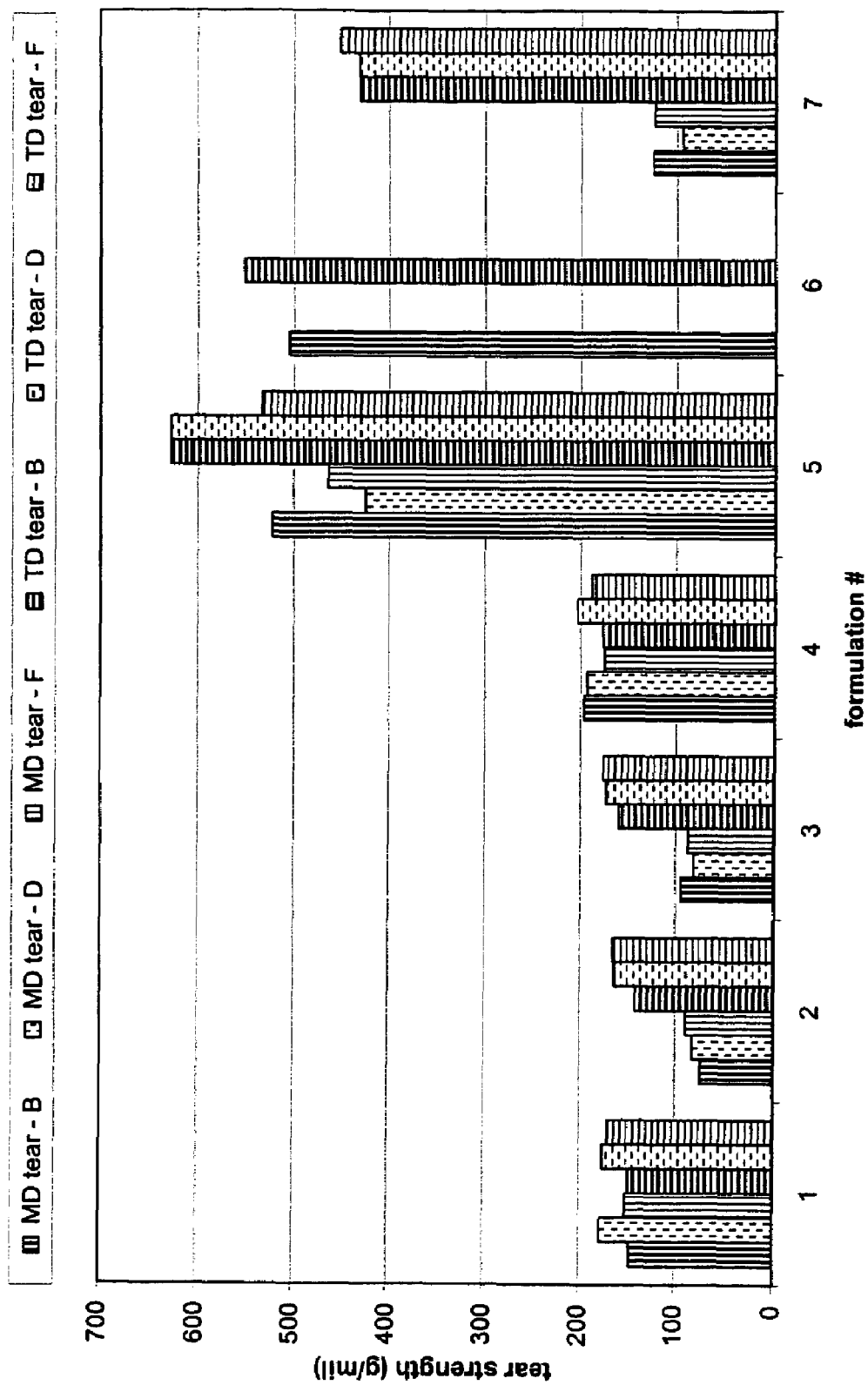
FIG. 13 illustrates the effect of various formulations and processing parameters on tear resistance.

As illustrated in FIG. 13, formulation 6B was again found to be far better than the others by a factor of 2 to 4. On the other hand, puncture resistance also improved with increasing VA content (see formulation 2B, 3B & 4B).

The presence of the anti-skid did not have a major effect on puncture resistance. Yet a small negative effect was observed and this was slightly more pronounced with the use of anti-skid having a narrow particle size range than with anti-skid having a broader particle size range.

4. Tear Resistance

Elmendorf tear testing was performed both in MD and TD. As summarised in FIG. 13, TD tear resistance was found to be superior to MD tear resistance in most cases, with the exception of formulation 1, which consisted of pure LDPE and exhibited more balanced tear properties.

Use of LLDPE FP-117 (as in formulations 5 and 6) and/or plastomer (as in formulation 6) were found to provide high tear resistance in both machine and transversal directions. Use of plastomer in place of EVA appeared to be adequate for applications in which the film is required to have high tear resistance. Increasing vinyl acetate (VA) content was also found to provide better tear resistance, but with limited improvement.

These results further demonstrate that the presence of anti-skid has only a small detrimental effect on tear resistance and, therefore, can be used in high tear resistant films.

5. Stretch Ability Evaluation

Figure 14:
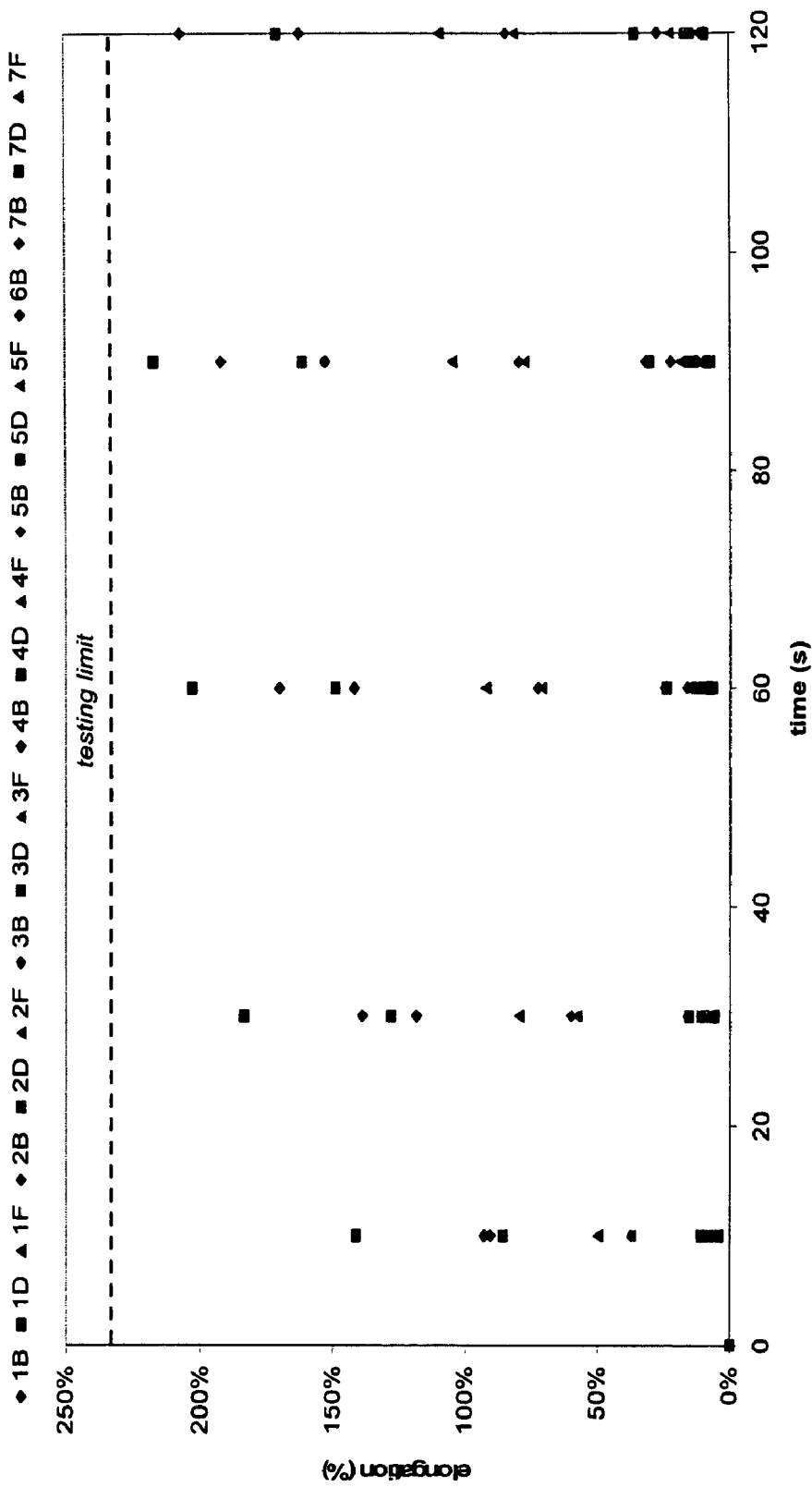
FIG. 14 illustrates the effect of various formulations on stretch ability of films prepared using a blow-up ratio (BUR) of 3.0.
Figure 15:
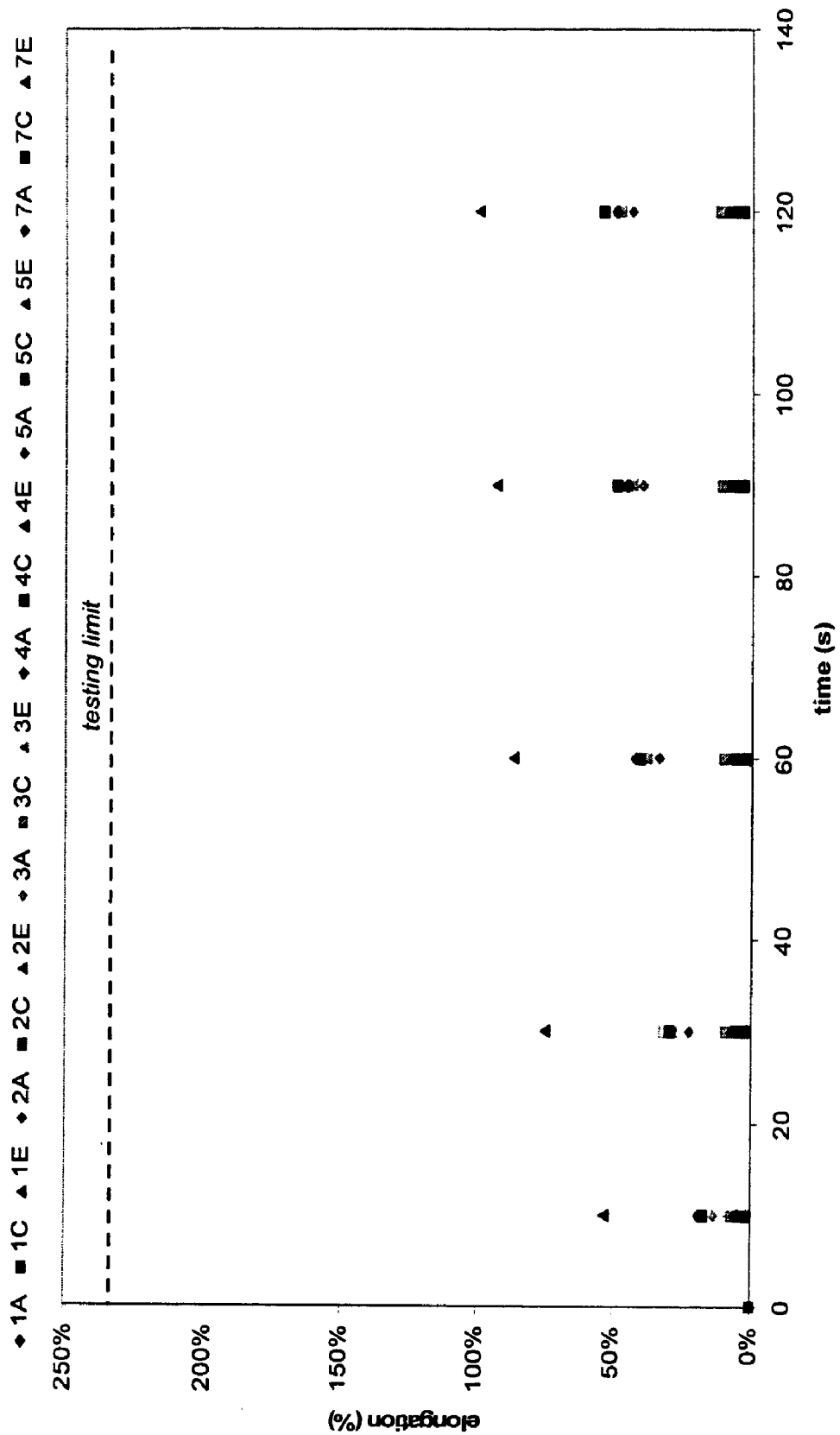
FIG. 15 illustrates the effect of various formulations on stretch ability of films prepared using a blow-up ratio (BUR) of 2.0.

FIGS. 14 and 15 depict results for all formulation at BUR of 3.0 (samples B, D and F) and at BUR of 2.0 (samples A, C and E). The testing described herein was limited to approximately 235% stretching due to the INSTRON framework. This test limit is indicated on each graph.

The results demonstrate that blow-up ratio appears to be a critical processing factor for a film's ability to stretch. Irrespective of formulation, the higher the BUR, the higher the stretch ability of the film. With a BUR of 2.0, the maximum elongation reached did not go beyond 100%, whereas this level of stretching was easily attainable with films produced using a BUR of 3.0 (formulation 3, 4 and 6). While not intending to be bound by theory, this blow-up ratio influence may be due to randomising effect of the orientation with increasing blow-up ratio. Thus, increasing BUR decreases anisotropy in machine direction and leads to a much higher degree of isotropy of the film.

At BUR of 3.0, the use of inelastic anti-skid having a narrow particle size distribution appeared to have either no effect or a slight improvement on the stretching ability of the film. The use of the anti-skid having a broader particle size distribution altered the stretch ability of the film (see formulations 3, 4 and 7) to a small extent. This was not observed in films prepared using a BUR of 2.0. The difference between the effect of the two anti-skids may be attributable to their composition or their particle size distribution. In both cases, however, they were used to prepare films having good stretch ability and elasticity.

Figure 16:
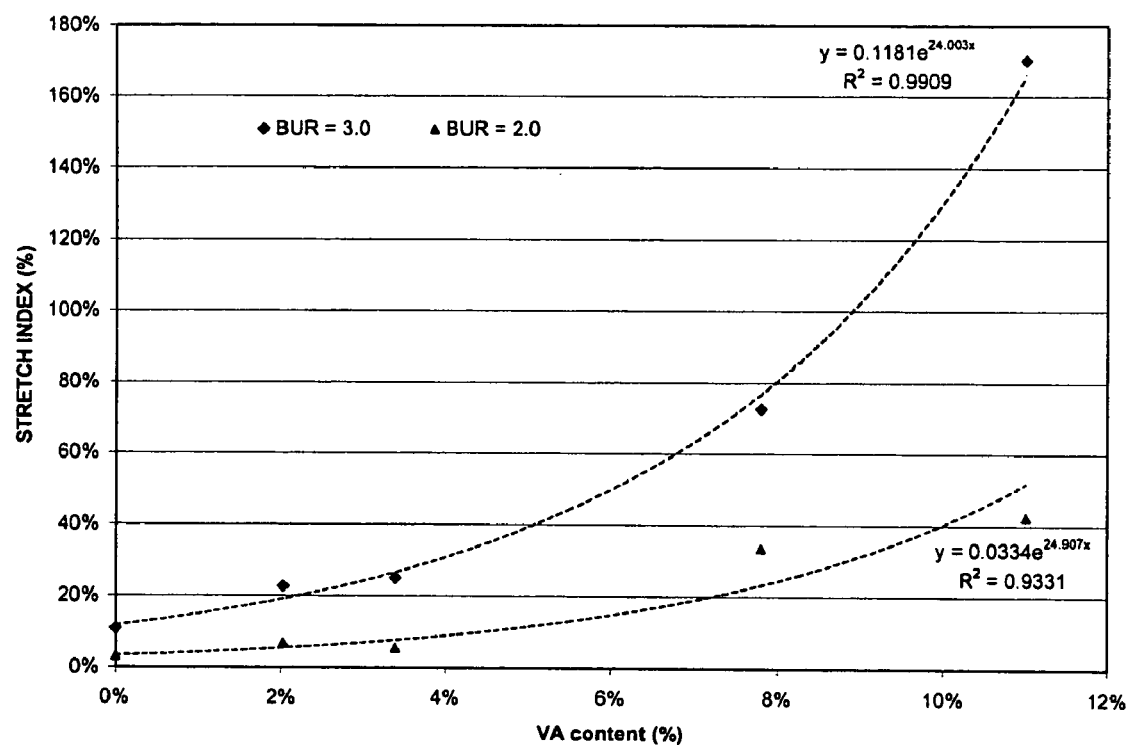
FIG. 16 illustrates the effect of VA content on the stretch index of films prepared using a BUR of 2.0 or 3.0.

As for formulation comparison, it was found that the higher the VA content the more stretchable the film. A plot of stretch index SI versus VA content is provided in FIG. 16, which shows an exponential correlation between these two characteristics. This was observed for both BUR of 2.0 and 3.0.

The results of these studies also demonstrate that use of plastomer provides a very good stretch ability of the film.

The stretch ability of a film comprising plastomer was similar to that of a film containing 60% EVA with 18% VA content.

Films made from formulation 5, consisting of pure LLDPE, were found to have slightly better stretch ability than films formed from formulation 1, consisting of pure LDPE. This is likely a density-related effect since density of the LLDPE is 0.917 g/cm$^3$, in comparison with 0.921 g/cm$^3$ for the LDPE.

6. Elastic Force Evaluation

Figure 17:
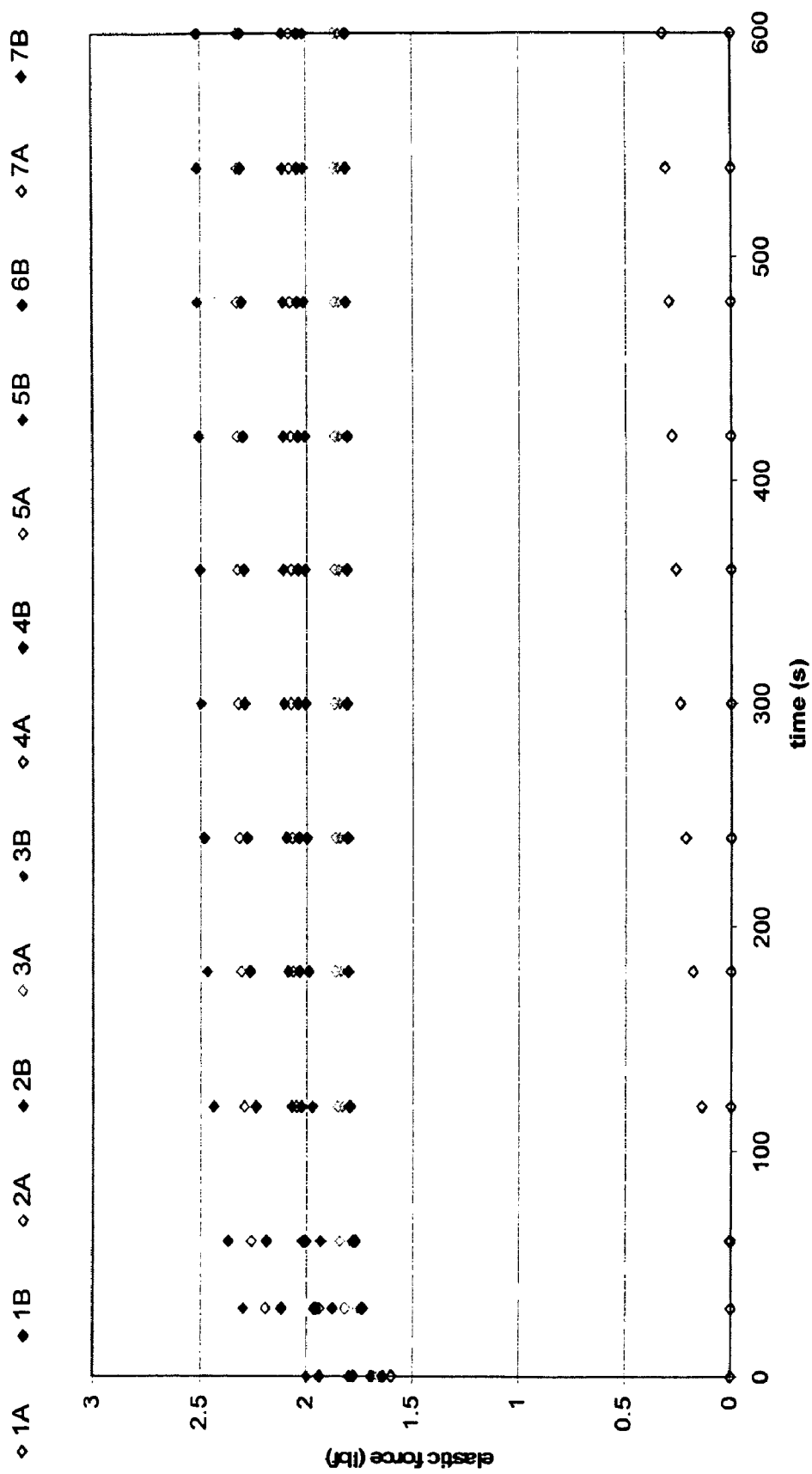
FIG. 17 illustrates the effect of various formulations on elastic force of films prepared using a blow-up ratio (BUR) of 2.0 or 3.0.

Elastic retention performance was compared in films prepared from formulations 1 to 7 at BUR of 2.0 and 3.0, without use of anti-skid. This testing demonstrated that a BUR that is too low is detrimental to elastic properties. This is mainly due to the fact that low BUR tends to lead to more neck-in of the film during stretching. The term "neck-in" effect refers to TD dimension change during film stretching. This effect was pronounced in films prepared from formulation 1, consisting of LDPE, and from formulation 7 (see FIG. 17).

The use of LLDPE in the film resulted in better retention force than use of LDPE, but, again, this observation may be simply related to a density effect.

Figure 18:
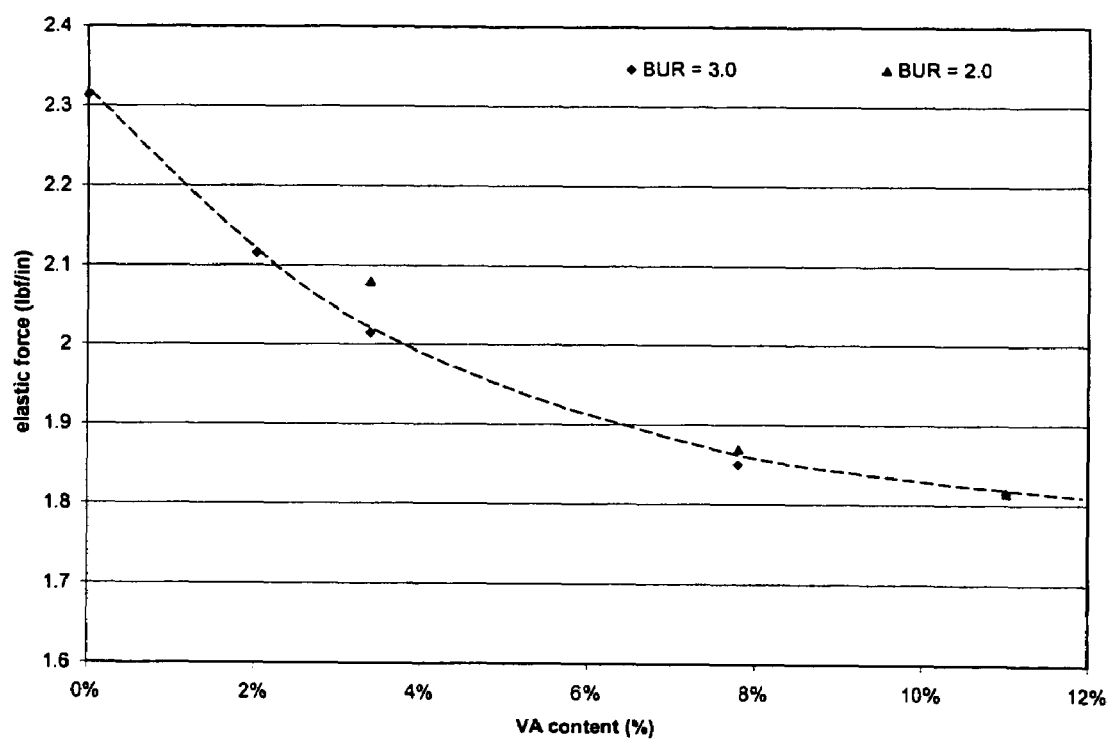
FIG. 18 illustrates the effect of VA content on the elastic force of films prepared using a BUR of 2.0 or 3.0 and containing no anti-skid additive.
Figure 19:
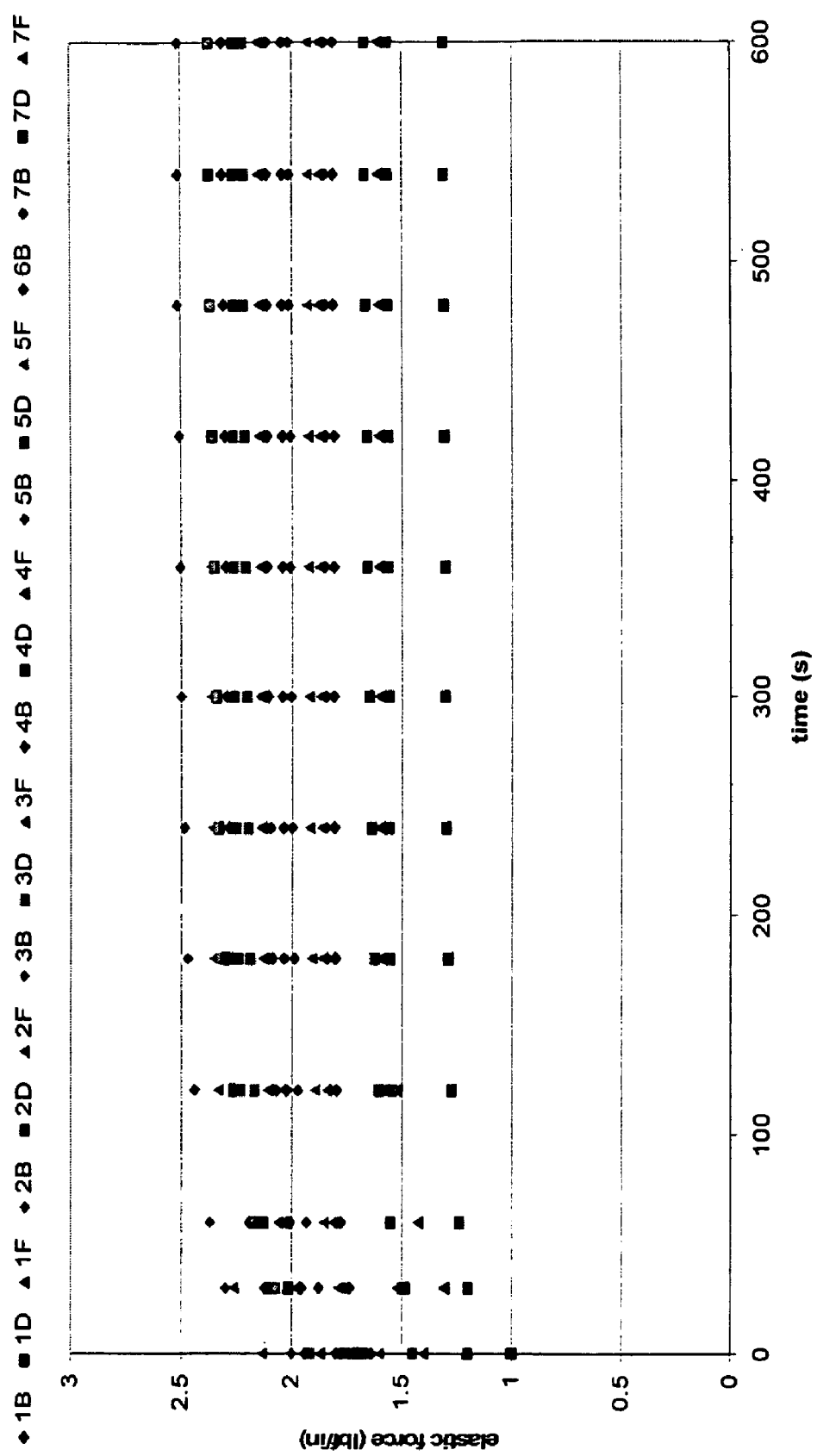
FIG. 19 illustrates the effect of various formulations on elastic force of films prepared using a blow-up ratio (BUR) of 3.0.
Figure 20:
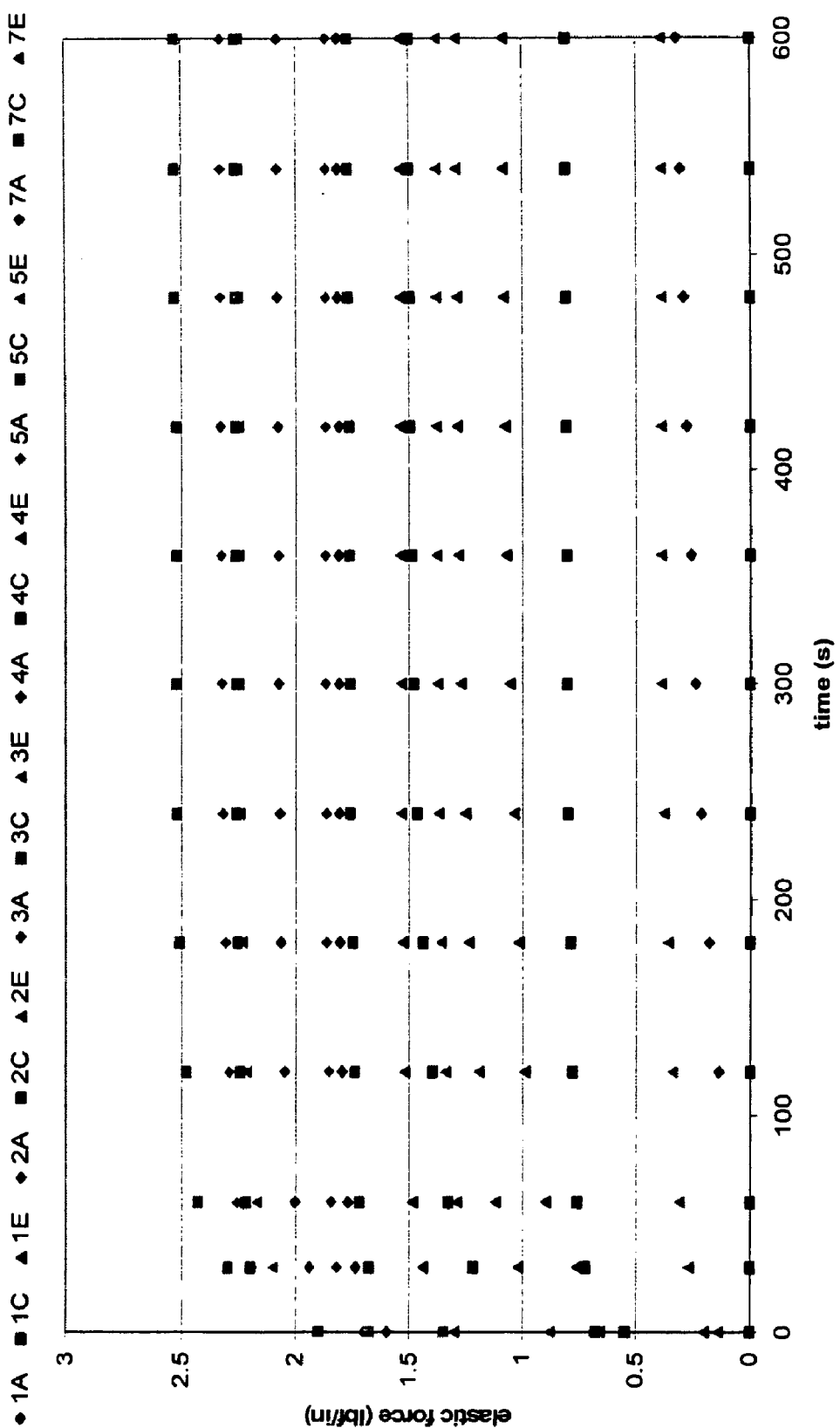
FIG. 20 illustrates the effect of various formulations on elastic force of films prepared using a blow-up ratio (BUR) of 2.0.

In contrast to its effect on stretch ability, a higher VA content was found to lower elasticity of the film. This relationship is illustrated in FIG. 18 and appears to be independent on blow-up ratio.

Use of plastomer (formulation 6) was found to provide a very good retention force in films, similar to films containing low VA content. The use of the plastomer-containing formulation appeared to provide films having both good stretch ability and elasticity retention.

In films prepared using a BUR of 3.0, the use of the inelastic anti-skid having the broader particle size distribution did not appear to affect the elastic force as much as the use of small anti-skid particle (see all formulations). This effect was not observed in films prepared using a BUR of 2.0, however, this may be due to the fact that neck-in of the films was observed at this low blow-up ratio level.

D. Conclusion

The results collected from this Example demonstrate that good film stretch ability can be achieved via the use of LLDPEs, LDPEs, EVAs and/or plastomers in a co-extrusion multi-layer structure comprising anti-skid additive. In the case of films containing EVAs, this stretching ability is directly related to vinyl acetate content. Stretch ability of film containing plastomer can be similar to the stretch ability of film having a high VA content.

To some extent, retention force coming from elastic memory after a film stretching history may be very suitable for certain applications. Generally, elastic force recovery is superior with linear resins such as LLDPE and plastomers than with EVAs. In the case of EVA-based films, this property is inversely proportional to vinyl acetate content, which means that as VA content increases elastic force recovery decreases. As a result, films having a low VA content will exhibit less compression strength against a unitised material or bundle. On the other hand, plastomer can be used to achieve good retention force, similar to films having low VA content.

In term of mechanical properties, use of plastomer was found to provide an improvement in tear, impact, and puncture resistance, but this was at the cost of stiffness. Depending on the application of the film decreased stiffness may be acceptable. LDPE or LLDPE may be added in order to increase stiffness of the film if necessary.

It has been further demonstrated that it is possible to manufacture films with acceptable stretch ability and elasticity using inelastic anti-skid, the anti-skid size being an important factor. The following table summarises the effect of the two anti-skid types on investigated properties, where "~" indicates no significant impact, "+" indicates a positive effect and "−" indicates a negative effect.

| Test | Anti-skid Particle Size Distribution | |
|---|---|---|
| | Narrow | Broader |
| Dart impact | ~ | ~ |
| Low friction puncture | − | − |
| Tear resistance | ~ | ~ |
| Stretch ability - high BUR | + | − |
| Stretch ability - low BUR | ~ | ~ |
| Elasticity - high BUR | − | ~ |
| Elasticity - low BUR | ~ | ~ |

Blow-up ratio has been found to be a key processing parameter that affects the stretch ability and elasticity properties of the film produced. A lack of control of this processing parameter can lead to product inconsistency. A low BUR will lead to increase neck-in effect; therefore, the high BUR is preferable. A BUR between 1.0 and 5.0 can be used to manufacture the film of the present invention. Advantageously, the BUR is greater than 2.5.

In summary, all of the main components of the film will contribute to some extent to the stretch ability and elasticity of the film. By modifying the type or amount of one or more of the resins it is possible to obtain a film having the required characteristics for different applications. For example, if it is necessary for the film to have high puncture resistance, the results provided in this application indicate that the addition of POP in place of the EVA will lead to increased puncture resistance.

All publications, patents and patent applications mentioned in this specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An elastomeric film comprising one or more layers and having a total thickness of from about 1 mil to about 15 mil, wherein at least one of said one or more layers comprises from about 0.1 to about 10% by weight of an anti-skid additive, wherein the anti-skid additive has a particle size of between 50 and 500 microns and does not melt or has a melt temperature greater than 500° F., and wherein said elastomeric film is such that:

(i) a first sample of said elastomeric film having a width of 1 inch and a length of 8 inches has an elastic force of at least 97 psi at 600 seconds following a stretching cycle, said stretching cycle including stretching said first sample in the transverse direction to 50% elongation at a velocity of 20 inch/min and returning to 25% elongation, and (ii) a second sample of said elastomeric film having a width of 1 inch and a length of 8 inches exhibits an elongation of at least 6% following application of an average stress of 1000 psi to said second sample for 120 seconds.

2. The elastomeric film according to claim 1, wherein the film comprises between 2 and 11 layers and each layer makes up from 5 to 95% of the total thickness.

3. The elastomeric film according to claim 1, wherein at least one layer comprises 10 to 100% of an ethylene-vinyl acetate (EVA) copolymer.

4. The elastomeric film according to claim 3, wherein the EVA copolymer is selected from the group consisting of pure EVA copolymer having from 2 to 45% vinyl acetate by weight.

5. The elastomeric film according to claim 3, wherein each EVA copolymer-containing layer or layers comprises 10 to 95% of the EVA copolymer.

6. The elastomeric film according to claim 3, wherein the at least one layer comprises 25 to 85% of the EVA copolymer.

7. The elastomeric film according to claim 1, wherein at least one layer comprises a polyolefin plastomer (POP) having a density of 0.910 g/cm$^3$ or lower.

8. The elastomeric film according to claim 7, wherein the POP is a metallocene catalyzed copolymer having a density of less than or equal to 0.910 g/cm$^3$ and a melt index of from 0.1 to 30 g/10 minutes.

9. The elastomeric film according to claim 7, wherein the POP is a Ziegler-Natta-catalyzed copolymer having a density of less than or equal to 0.910 g/cm$^3$ and a melt index between 0.1 and 30 g/10 minutes.

10. The elastomeric film according to claim 7, wherein the POP is a copolymer of ethylene and a $C_4$-$C_{20}$ alpha-olefin.

11. The elastomeric film according to claim 1, wherein at least one layer comprises 5 to 100% of a copolymer of linear low density polyethylene (LLDPE) having a density of greater than 0.9 10 g/cm$^3$.

12. The elastomeric film according to claim 11, wherein the copolymer of LLDPE is a pure copolymer of a $C_4$-$C_{20}$ alpha-olefin.

13. The elastomeric film according to claim 11, wherein the copolymer of LLDPE has a melt index between 0.1 and 30 g/10 mm.

14. The elastomeric film according to claim 11, wherein each LLDPE copolymer-containing layer or layers comprises 10 to 95% of the copolymer of LLDPE.

15. The elastomeric film according to claim 14, wherein each LLDPE copolymer-containing layer or layers comprises 15 to 75% of the copolymer of LLDPE.

16. The elastomeric film according to claim 1, wherein at least one layer comprises 5 to 100% of low density polyethylene (LDPE) having a density between 0.910 and 0.930 g/cm$^3$.

17. The elastomeric film according to claim 16, wherein the LDPE has a melt index of from 0.1 to 30 g/10 minutes.

18. The elastomeric film according to claim 16, wherein each LDPE-containing layer or layers comprises 10 to 95% of the LDPE.

19. The elastomeric film according to claim 16, wherein each LDPE-containing layer or layers comprises 15 to 75% of the LDPE.

20. The elastomeric film according to claim 1, wherein at least one layer comprises a combination of at least two of resins selected from the group consisting of EVA copolymer, POP, LLDPE and LDPE.

21. The elastomeric film according to claim 1, wherein the anti-skid additive has a particle size between 60 and 250 microns.

22. The elastomeric film according to claim 21, wherein the anti-skid additive has a particle size between 60 and 180 microns.

23. The elastomeric film according to claim 1, wherein the anti-skid additive is an ultra high molecular weight polyethylene (UHMWPE).

24. The elastomeric film according to claim 1, wherein at least one layer comprises a UV stabilizer, a pigment, a slip agent, a blocking agent, an antistatic agent or any combination thereof.

25. The elastomeric film according to claim 1, wherein the film consists of three layers that are an inside layer, a core layer and an outside layer.

26. The elastomeric film according to claim 25, wherein:
(a) the inside layer is 15% of the total thickness and comprises ethylene vinyl acetate (EVA) copolymer having 6.5% vinyl acetate by weight, linear low density polyethylene LLDPE hexene copolymer, carbon black, calcium carbonate, UV stabilizer and antistatic additive;
(b) the core layer is 70% of the total thickness and comprises EVA copolymer having 6.5% vinyl acetate by weight, polyethylene copolymer of hexene produced using a Ziegler-Natta catalyst, titanium dioxide, UV stabilizer and antistatic additive; and
(c) the outside layer is 15% of the total thickness and comprises EVA copolymer having 6.5% vinyl acetate by weight, polyethylene copolymer of hexene produced using a Ziegler-Natta catalyst, titanium dioxide, UV stabilizer, fluorelastomer and the anti-skid additive.

27. The elastomeric film according to claim 25, wherein:
(a) the inside layer is 20% of the total thickness and comprises 100% linear low density polyethylene (LLDPE);
(b) the core layer is 60% of the total thickness and comprises 100% LLDPE; and
(c) the outside layer is 20% of the total thickness and comprises 100% LLDPE.

28. The elastomeric film according to claim 1, wherein the film is in the form of a pre-folded U-film, J-film, tube or gussetted film.

29. The elastomeric film according to claim 28 which is a pre-folded gussetted film having a first film panel and a second opposing film panel, a closed edge and a parallel open edge extending along the length opposite the closed edge, wherein the first and the second opposing film panels are connected at the closed edge and the gusset is formed along the length of the film at the closed edge.

30. The elastomeric film according to claim 29, wherein the parallel open edge of the film corresponds to an edge of the first film panel and an edge of the second film panel and an inwardly folded lip is formed at each edge of the film panels.

31. An elastomeric film comprising one or more layers and having a total thickness of from about 1 mil to about 15 mil, wherein at least one of said one or more layers comprises from about 0.1 to about 10% by weight of an anti-skid additive dispersed within the at least one layer, wherein the anti-skid additive has a particle size of between 50 and 500 microns, does not melt or has a melt temperature greater than 500° F., and wherein said elastomeric film is such that:
(i) a first sample of said elastomeric film having a width of 1 inch and a length of 8 inches has an elastic force of at least 97 psi at 600 seconds following a stretching cycle, said stretching cycle including stretching said first sample in the transverse direction to 50% elongation at a velocity of 20 inch/min and returning to 25% elongation, and (ii) a second sample of said elastomeric film having a width of 1 inch and a length of 8 inches exhibits an elongation of at least 6% following application of an average stress of 1000 psi to said second sample for 120 seconds.

32. An elastomeric film comprising one or more layers and having a total thickness of from about 1 mil to about 15 mil, wherein at least one of said one or more layers comprises from about 0.1 to about 10% by weight of an anti-skid additive, wherein the anti-skid additive has a particle size of between 50 and 500 microns and does not melt or has a melt temperature greater than 500° F., does not induce lensing or micro-perforation formation in the elastomeric film both during formation and use of the film, and wherein said elastomeric film is such that:

(i) a first sample of said elastomeric film having a width of 1 inch and a length of 8 inches has an elastic force of at least 97 psi at 600 seconds following a stretching cycle, said stretching cycle including stretching said first sample in the transverse direction to 50% elongation at a velocity of 20 inch/mm and returning to 25% elongation, and (ii) a second sample of said elastomeric film having a width of 1 inch and a length of 8 inches exhibits an elongation of at least 6% following application of an average stress of 1000 psi to said second sample for 120 seconds.

* * * * *